(12) United States Patent
Modroukas et al.

(10) Patent No.: US 8,882,863 B2
(45) Date of Patent: Nov. 11, 2014

(54) FUEL REFORMULATION SYSTEMS

(75) Inventors: Dean Modroukas, Scarsdale, NY (US); Jason S. Tyll, Blue Point, NY (US); John C. Leylegian, White Plains, NY (US); Florin Girlea, Flushing, NY (US); Richard Perlman, Pembroke Pines, FL (US)

(73) Assignee: Alliant Techsystems Inc., Arlington, VA (US)

( * ) Notice: Subject to any disclaimer, the term of this patent is extended or adjusted under 35 U.S.C. 154(b) by 1307 days.

(21) Appl. No.: 12/465,407

(22) Filed: May 13, 2009

(65) Prior Publication Data

US 2009/0283058 A1 Nov. 19, 2009

Related U.S. Application Data

(60) Provisional application No. 61/127,750, filed on May 14, 2008.

(51) Int. Cl.
*B01J 7/00* (2006.01)

(52) U.S. Cl.
USPC ................. 48/61; 48/127.9; 48/76; 422/632; 422/633; 422/634; 422/635; 422/636; 422/646; 422/649; 422/653; 123/272; 123/274; 123/276

(58) Field of Classification Search
USPC ........... 48/61, 127.9; 422/632–636, 646, 649, 422/653; 123/272, 274, 276
See application file for complete search history.

(56) References Cited

U.S. PATENT DOCUMENTS

| | | | |
|---|---|---|---|
| 2,758,580 A | 8/1956 | Balzer | |
| 2,902,985 A | 9/1959 | Kloss | |
| 2,966,146 A | 12/1960 | Schweitzer et al. | |
| 4,156,409 A | 5/1979 | Nakano | |
| 5,125,380 A | 6/1992 | Nakae et al. | |
| 5,277,159 A | 1/1994 | Webster | |
| 6,230,689 B1 | 5/2001 | Tengroth et al. | |
| 6,360,701 B1 | 3/2002 | Ruch | |
| 6,505,462 B2 | 1/2003 | Meholic | |
| 7,018,435 B1* | 3/2006 | Wentinck | 48/198.8 |
| 7,082,753 B2* | 8/2006 | Dalla Betta et al. | 60/286 |
| 7,201,120 B2 | 4/2007 | Geyer et al. | |
| 7,691,160 B2* | 4/2010 | Kirwan et al. | 48/61 |
| 7,799,314 B2* | 9/2010 | Agnihotri et al. | 423/650 |
| 8,074,895 B2* | 12/2011 | Mao et al. | 239/102.2 |
| 2002/0081253 A1* | 6/2002 | Abe | 422/211 |
| 2002/0124836 A1* | 9/2002 | Reddy | 123/518 |
| 2005/0217178 A1* | 10/2005 | Aoyama | 48/127.9 |
| 2009/0113889 A1* | 5/2009 | Roychoudhury et al. | 60/524 |
| 2010/0040919 A1* | 2/2010 | Ravenda et al. | 429/19 |

* cited by examiner

*Primary Examiner* — Kaity V. Handal
(74) *Attorney, Agent, or Firm* — TraskBritt

(57) ABSTRACT

A fuel reformulation system for an engine comprising an annular body for a flow of fluids therethrough connected to the engine, a source of fuel for flowing through at least a portion of the annular body, and a catalytic member connected to the annular body for the flow of any fluids thereacross from the annular body.

27 Claims, 29 Drawing Sheets

FUEL REFORMULATION SYSTEMS

CROSS-REFERENCE TO RELATED APPLICATION

This application claims the priority to U.S. Provisional Patent Application Ser. No. 61/127,750, filed May 14, 2008, for "HySpike Multifuel Engine," the entire disclosure of which is hereby incorporated herein.

FIELD OF THE INVENTION

The present invention relates to a catalytic fuel reformulation material and system for use in engines.

BACKGROUND

A fundamental difficulty in operating any common type of internal combustion engine on multiple fuels is that engine design, operating cycle, and fuel combustion properties are tied together. Highly efficient engines take advantage of inherent fuel properties by the nature of their design. Hydrocarbon blends used for fuel are categorized by performance specifications based on physical measurements of the fuel, and not on the chemical composition of the fuel. As such, the blend for any given fuel will vary so long as the relevant performance specifications for such fuel remain essentially constant.

Internal combustion engines generally comprise three common types. One type of internal combustion engine comprises a spark ignition cycle (Otto cycle) while a second type comprises a compression ignition cycle (Diesel cycle) and a third type comprises a gas compression-ignition cycle, such as a gas turbine engine, a pulse jet engine, a ramjet engine, and a scram jet (supersonic combustion ramjet) engine.

Some fuels, such as gasoline, for spark ignition engines, are commonly characterized by the performance specification referred to as octane number which indicates the fuel's resistance to early ignition and knock of the fuel/air mixture in the engine. High values of octane number for a fuel for spark ignition engines are required to avoid early ignition of the fuel/air mixture in the engine which leads to the problem commonly known as combustion knock in the engine. On the other hand, fuels for compression ignition engines, commonly known as diesel fuel, are generally characterized by the performance specification of cetane number, which indicates the ease of ignition of the fuel/air mixture in the engine. A high cetane number is desired for the fuel of a compression ignition engine to avoid delayed ignition of the fuel/air mixture which leads to incomplete combustion of the fuel/air mixture commonly perceived as smoke production by the engine. Other fuels, such as those for gas turbines, are characterized by the performance specification JP-5, JP-8, JP-10, etc., which are specifically suited for gas turbine engines.

An octane rating number is a measure of the auto-ignition resistance of gasoline and other fuels used in spark ignition internal combustion engines. It is a measure of anti-detonation of a gasoline or fuel. Octane number is the number which gives the percentage, by volume, of iso-octane in a mixture of iso-octane and normal heptane, which would have the same anti-knocking capacity as the fuel which is under consideration. An octane rating number for a fuel for a spark ignition internal combustion engine is a performance specification, used specifically to categorize blends of gasolines, that is based on physical measurements made on running a test engine on a specific blend of fuel (gasoline). The most common type of octane rating is the Research Octane Number (RON) which is determined by running the fuel in a test engine with a variable compression ratio under controlled conditions, and comparing these results with those for mixtures of iso-octane and n-heptane. Another type of octane rating is called Motor Octane Number (MON), or the aviation lean octane rating, which is a measure of how the fuel (gasoline) behaves when under load. The MON octane rating number for a fuel (gasoline) is determined by using a similar test engine to that used to determine the RON octane number for a fuel (gasoline) but with a preheated fuel mixture, a higher engine speed, and variable ignition timing to stress the fuel's knock resistance. Depending on the composition of the fuel, the MON octane rating of current fuels (gasolines) will be about 8 to 10 points lower than the RON octane rating for the same fuel.

In most countries (including Europe and Australia) the octane rating number for a fuel for a spark ignition internal combustion engine is the RON octane rating number for the fuel, but in the United States, Canada and some other countries the octane rating number is the average of the RON octane rating and the MON octane rating for the fuel (gasoline), sometimes referred to as the Anti-Knock Index (AKI), Road Octane Number (RdON), Pump Octane Number (PON, or (R+M)/2). because of the 8 to 10 point difference of the octane rating for fuel (gasoline) using the MON octane rating, fuel in the United States will have an octane rating about 4 to 5 points lower than the octane rating of the same fuel elsewhere. Typically, spark ignition internal combustion engines are designed to operate on fuel (gasoline) blends having a regulated octane number (average of motor and research) in the range of 87 to 93. Various combinations of hydrocarbons can have the same octane number if they perform the same in an engine. Spark ignition internal combustion engines require a fuel that is not easily ignited by the high gas temperatures created during the compression stroke or during the process of combustion, allowing for a controlled combustion along a "flame front" in the cylinder and combustion chamber of the engine. High compression ratio spark ignition internal combustion engines require high octane number fuel, based on any octane rating method to deter mine the octane rating for the fuel, making the fuel knock resistant (e.g., having delayed combustion characteristics) for the engine to achieve a higher efficiency and deliver more power.

Cetane number, or CN, is a measurement of the combustion quality of fuel (diesel) used for compression ignition engines. The cetane number of a fuel is defined as the percentage by volume of normal cetane in a mixture of normal cetane and alpha-methyl naphthalene which has the same ignition characteristics (ignition delay) as the test fuel when combustion is carried out in a standard compression ignition engine under specified operating conditions. Cetane number is a measure of a fuel's ignition delay (the time period between the start of injection and the start of combustion (ignition) of the fuel). Cetane numbers are only used for relatively light distillate diesel oils.

Generally, compression ignition (diesel) engines run well using fuels having a rating with a cetane number (CN) from 40 to 55. Since fuels having a higher cetane number which have shorter ignition delays providing more time for the fuel combustion process to be completed, higher speed compression ignition (diesel) engines operate more effectively with higher cetane number (CN) fuels. There is no performance or emission advantage when the CN of a fuel is raised past approximately 55 as the fuel performance plateaus. In the United States currently, fuels for compression ignition (diesel) engines are available having a cetane number (CN) in the range of 44 to 50 while in Europe, the fuels for compression ignition (diesel) engines must have a cetane number (CN) rating at a minimum of 51.

Again, various combinations of hydrocarbons can have the same cetane number if they perform the same in an engine. Normal operation in a typical compression ignition (diesel) engine requires a fuel with regulated cetane number in the range of 40 to 60 with cetane numbers up to 50 being referred to as premium. Since a high cetane number fuel is easy and quick to ignite with high gas temperatures, compression ignition engines are designed to ignite the fuel, after it is injected, with the high gas temperatures in the cylinder and combustion chamber of the engine created during the compression stroke of the engine igniting the injected fuel. As the lower limit for fuel for compression ignition engines is a cetane number (CN) of 40, the use of lower cetane number fuels (less than 40) results in increased exhaust smoke production, difficulty in engine starting, especially in cold weather or high-altitudes, rough engine operation due to large cycle-to-cycle variations in power output, accelerated engine deposits from incomplete fuel combustion, reduced engine efficiency due to incomplete fuel combustion, and accelerated lube oil sludge formation form incomplete fuel combustion. Consequently, most compression ignition engine manufacturers recommend the use of diesel fuels with a cetane number of at least 40.

It can be seen that a high-octane number fuel inherently has a low cetane number (CN) and vice versa. As a result, fuels intended for operation in compression ignition engines are poorly suited for use in spark ignition engines, and fuels intended for use in spark ignition engines are poorly suited for use in compression ignition engines.

In yet another category, fuels for gas turbine engines, commonly referred to as jet fuels such as JP-5, JP-8 and JP-10 are also categorized using performance specifications, although different ones are specifically suited for their use in gas turbine engines. Neither cetane number nor octane number is used in the specification of fuels for gas turbine engines. As such, specifications for fuels for gas turbine engines are not regulated and held constant, as each batch of refined fuel varies as to chemical composition. The chemical composition of any batch of fuel can vary as long as the appropriate performance specifications for gas turbine operation are met. Gas turbine fuels exhibit variable octane numbers and cetane numbers, typically having low octane numbers and cetane numbers lower than 40. As a result, the use of fuels for gas turbine engines in any internal combustion engines of either compression or spark ignition type is problematic.

SUMMARY OF THE INVENTION

The present invention relates to a fuel reformulation material and system for engines.

DETAILED DESCRIPTION OF THE INVENTION

Figure 1:
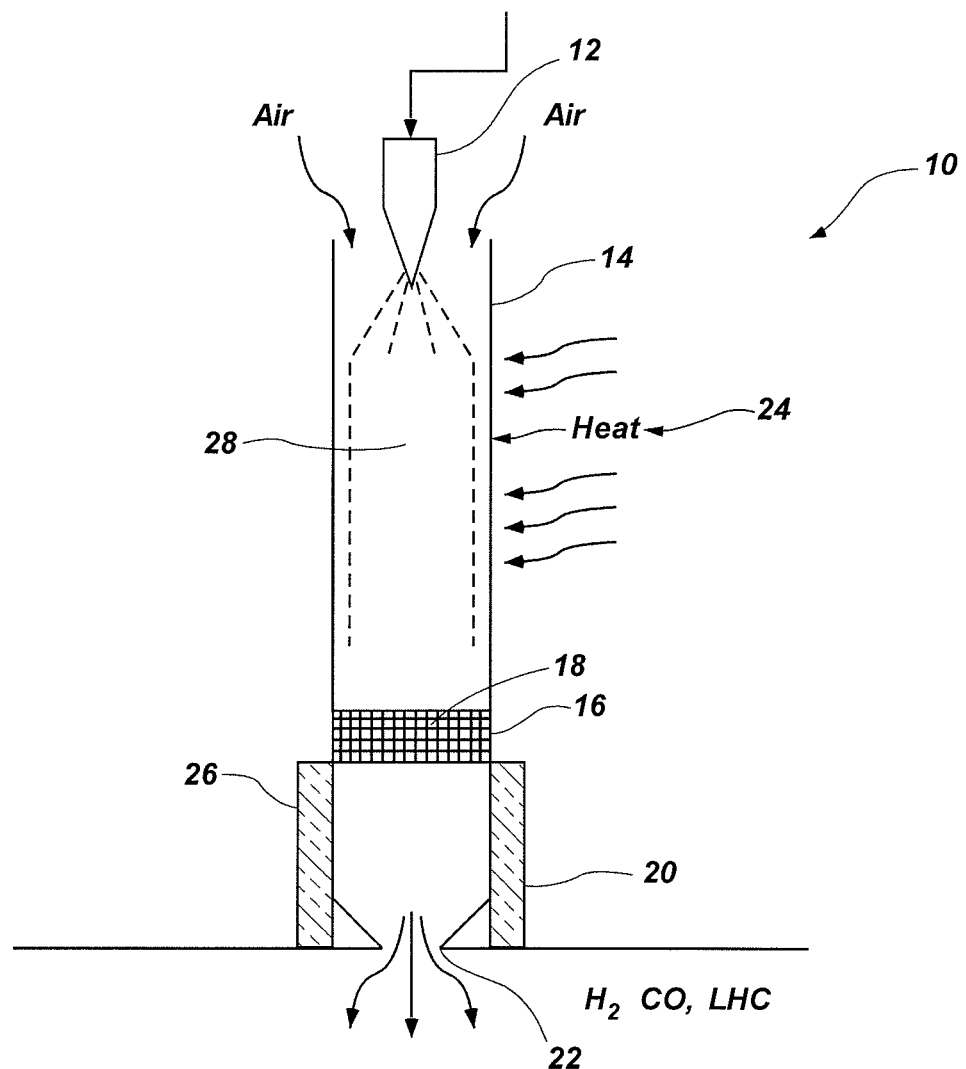
FIG. 1 is a schematic representation of a fuel reformulation system.

In some instances, it is desirable to operate either a spark ignition internal combustion engine or a compression ignition internal combustion engine or other types of compression-ignition engines on a variety of available fuels, such as gasoline, diesel fuel, or gas turbine fuels. In order to do so effectively in either spark ignition engines or compression ignition engines, to operate the engine efficiently it is necessary to increase the effective octane number or the cetane number (CN) of the fuel being used in the engine to a desirable range for the type and design of the engine. Either the octane rating or the cetane rating for a fuel being used for fuel in either a spark ignition internal combustion engine or a compression ignition internal combustion engine can be increased by employing hydrogen spiking via in situ fuel reformation or reforming the fuel to maintain the required ignition and reaction times and to minimize cycle-to-cycle variations in the engine.

For a spark ignition internal combustion engine, operating the engine on a lean fuel/air mixture for a specific fuel tends to increase its effective octane number. For example, leaning the fuel/air mixture for a fuel such as gasoline having a 65.7 octane number from a $\Phi=1.0$ to a $\Phi=0.7$ increases its effective octane number to 85.0 (4), wherein $\Phi$ is defined as the ratio of the fuel-to-oxidizer ratio of the fuel to the stoichiometric fuel-to-oxidizer ratio of the fuel. Leaning the fuel/air ratio of a spark ignition engine fueled with gasoline, having a knock limited compression ratio of 7.9:1 limited by pre-ignition spark knock, to a $\Phi=0.75$ increased the usable compression ratio to 10.4:1 with no substantial pre-ignition spark knock without any added combustion chamber turbulence and to an increased usable compression ratio of 12.0:1 with no substantial pre-ignition spark knock and with added combustion chamber turbulence. Leaning the fuel/air ratio of a spark ignition internal combustion engine fueled with gasoline, having a compression ratio of 6.7 limited by pre-ignition spark knock, to a $\Phi=0.59$ increased the usable compression ratio to 15.0:1 with no substantial pre-ignition spark knock without any added combustion chamber turbulence and required leaning the fuel/air ratio of to only a $\Phi=0.625$ for an increased compression ratio of 15.0:1 with no substantial pre-ignition spark knock and with added combustion chamber turbulence.

Leaning the fuel/air ratio for a fuel in a spark ignition internal combustion engine enables operation of the engine at a higher compression ratio, whereby improving efficiency, as efficiency of the engine is directly proportional to the compression ratio of the engine. Unfortunately, leaning of the fuel/air mixture of a spark ignition internal combustion engine tends to decrease the rate of combustion thereby tending to decrease efficiency of the engine. Additionally, cycle-to-cycle variations in the rate of combustion of a spark ignition internal combustion engine are increased during a lean fuel/air ratio operation.

Various embodiments set forth herein chemically modify a percentage of the fuel/air mixture with an in situ reformer into a blend of fuel/air gases including hydrogen so that hydrogen increases the rate of combustion and reduces cycle-to-cycle variations in various types of spark ignition internal combustion engines and compression ignition internal combustion engines for such engines to use a wider range of fuel than normally possible.

In order to ignite and burn fuels quickly it is advantageous to convert liquid hydrocarbon fuel into smaller, lighter fragments, e.g., hydrogen and ethylene. Short contact-time (SCT) substrate reactors for liquid hydrocarbon fuel can be used for reforming such fuel into smaller, lighter fragments, e.g., hydrogen and ethylene. The advantage of these short contact-time reactors is that they are, at least, theoretically capable of higher fuel conversions into smaller, lighter fragments, e.g., hydrogen and ethylene at high space velocities resulting in short residence times for the fuel in the reactor. Such reactors can be made compact, and therefore easy to integrate into the volume- and weight-limited environment.

Various options are available in engine design modifications to utilize the blend of gases produced by the short contact-time reactor. Some increase in the rate of combustion of a fuel/air mixture can be achieved by mixing the blend of gases with the lean mixture of fuel and air. If an additional rate of increase in combustion of a fuel/air mixture is required, modifying the combustion chamber to include a pre-chamber can further increase the rate of combustion. Adding a separate intake valve in a pre-combustion chamber to a normal intake valve for the main combustion chamber allows the main combustion chamber and pre-combustion chamber of an engine to be separately loaded with the fuel/air mixture and results in increased flexibility in controlling the rate of combustion in the main combustion chamber and pre-combustion chamber of an internal combustion engine. The blend of gases from the short contact-time reactor loaded separately can burn quickly in the pre-combustion chamber and produce a jet of flames that adds turbulence and increases burn rate in the main combustion chamber of an internal combustion engine because of the use of a small quantity of stoichiometric, turbulent, fast burning fuel/air mixture in the pre-combustion chamber.

Referring to drawing FIG. 1, a schematic representation of a fuel reformulation system 10 arrangement is illustrated. A fuel injector 12 sprays fuel in droplet form into an upper end of a delivery conduit 14 having air flowing therethrough while a bottom end or outlet 16 of the delivery conduit 14 has a catalytic partial oxidation screen member 18 located therein for the fuel/air mixture flowing through the delivery conduit 14 to react catalytically with precious metals on the screen member 18 causing the fuel/air mixture to break or decompose into various elements, such as hydrogen, carbon monoxide, and long chain hydrocarbons, flowing into a chamber 20 having an restricted outlet 22 for the fuel/air mixture elements to flow therefrom. The delivery conduit 14 may include a suitable heating device 24 to heat the fuel/air mixture flowing therethrough to increase the vaporization of the fuel droplets from the fuel injector 12. The chamber 20 may be insulated with a suitable insulation 26 to increase the catalytic reaction rate of breaking or decomposing the fuel/air mixture after flowing through catalytic screen member 18.

The ability to use for engine cold starts since the activity of the catalyst reduces the energy needed to initiate reaction. The technology supports near instantaneous, self-sustaining light-off at temperatures near 200° C. (can be achieved with simple glow plug arrangement).

When low pressure drop, short contact-time (SCT) elements are used as a catalytic screen member 18, such as catalytically coated wire mesh or screens stacked into the reactor housing, the SCT elements have ultra-short channel lengths, which prevent the formation of a hydrodynamic boundary layer build-up that is commonly observed in conventional long channel catalyst monolithic-type reaction members. SCT element configurations lead to exceptionally high heat and mass transfer properties with a high surface area resulting in increased reaction rates for the breaking or decomposition of the fuel/air mixture.

A compact, simple reactor housing consisting of a delivery conduit 14 having a mixing section 28 and catalytic partial oxidation screen member 18 relies on liquid fuel that is atomized yielding conically dispersed fuel droplets that may deposit as a thin film on the interior wall of the delivery conduit 14 having a suitable heating device 24 connected thereto. Air and vaporized fuel mix within the delivery conduit 14 near the interior wall thereof where there is little oxygen present in the air flowing through the delivery conduit 14 because of the fuel vapor boundary layer formed along the interior wall thereof. Since vaporization and mixing of the fuel with the air occurs essentially simultaneously, this avoids or reduces regions containing a combustible fuel/air mixture at a temperature above the auto ignition temperature of the fuel/air mixture. This vaporization/mixing process of the fuel and air occurs prior to contacting the catalytic partial oxidation screen member 18 at the lower end of the delivery conduit 14 where the partial oxidation reaction takes place caused by the catalytic partial oxidation screen member 18. The catalytic partial oxidation screen member 18 may comprise any suitable precious metal or material known to have catalytic properties to cause the partial oxidation of hydrocarbon fuels or materials, or sources of metal or material used in hydrocarbon cracking processes.

The reformed fuel/air mixture output stream of the reformulation system 10 represents a small percentage of overall fuel delivery with minimal impact on overall efficiency of the internal combustion engine to which it is connected.

Reforming gasoline, diesel fuel or gas turbine fuels into hydrogen and other small molecules of long chain hydrocarbons assists in forming a fuel/air mixture that burns very efficiently and over a broad range of operating conditions. Furthermore, the reformatted fuel/air mixture aids in reducing exhaust emissions of hydrocarbons and particulate matter which generate undesirable thermal or particulate-based signatures for an internal combustion engine.

Catalytic coating of SCT elements used as the catalytic screen member 18 has been shown to have excellent resistance to sulfur contamination in the fuel contacting the SCT elements used as the catalytic screen member 18.

Figure 2:
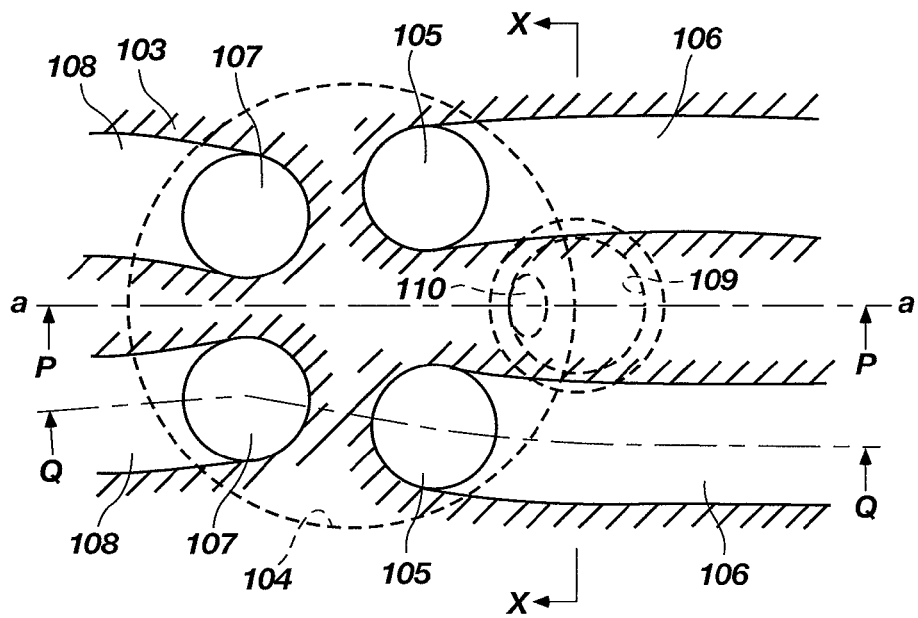
FIG. 2 is a cross-sectional plan view of a two-stroke Diesel cycle engine.
Figure 3:
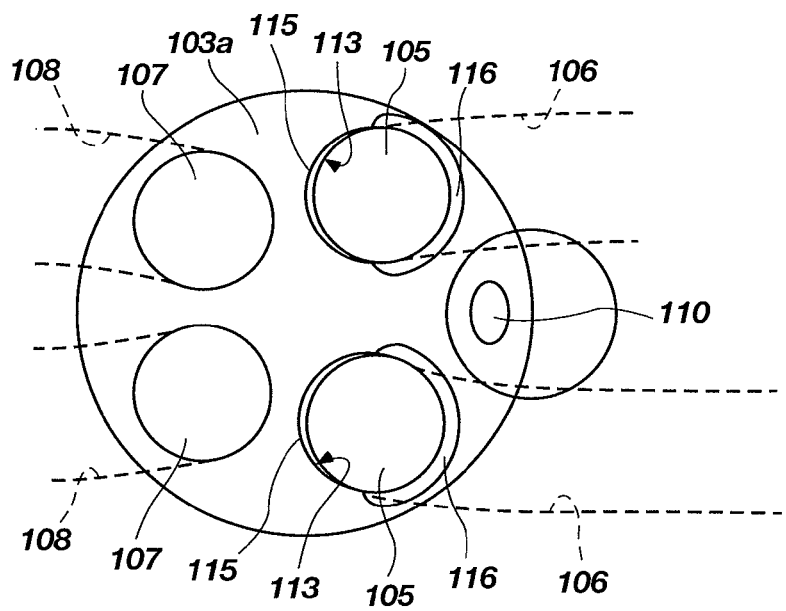
FIG. 3 is a view illustrating an inner wall of a cylinder head 103 head.

Generally referring to FIGS. 2 through 6, reference numeral 100 designates a cylinder block for a compression ignition (diesel) internal combustion engine, 102 is a piston reciprocally movable in the cylinder block 100, 103 is a cylinder head fixed onto the cylinder block 100, and 104 is a main combustion chamber formed between a flat inner wall 103a of the cylinder head 103 and a flat top face of the piston 102; 105 designates a pair of intake valves, 106 designates intake ports, 107 designates a pair of exhaust valves, and 108 designates exhaust ports; 109 designates a prechamber, 110 is an opening of the prechamber 109, which is positioned on a same plane as the inner wall 103a of the cylinder head 103, 111 is a fuel injector for injecting fuel into the prechamber 109, and 112 is a glow plug arranged in the prechanger 109. As illustrated in FIGS. 2 and 3, a pair of the intake valves 105 are arranged on one side of the inner wall 103a of the cylinder head 103, symmetrically with respect to the symmetrical plane a-a including the axis of the cylinder head 103; and a pair of the exhaust valves 107 are arranged on the other side of the inner wall 103a of the cylinder head 103, symmetrically with respect to the symmetrical plane a-a. Further, as can be seen from FIGS. 2 and 3, the distance between the intake valves 105 is larger than the distance between the exhaust valves 107. In the embodiment illustrated in FIGS. 2 and 3, the distance between the intake valves 105 is considerably larger than the transverse width of the opening 110, and is approximately equal to the diameter of the prechamber 109. Conversely, the distance between the exhaust valves 107 is smaller than the transverse width of the opening 110. The opening 110 is arranged in the peripheral portion of the inner wall 103a of the cylinder head 103, which portion is farthest from the exhaust valves 107, between the intake valves 105. Further, the opening 110 is arranged on the symmetrical plane a-a, and directed toward the central portion of the main combustion chamber 104 along the symmetrical plane a-a.

A pair of depressions 113 is formed in the inner wall 103a of the cylinder head 103, and valve seats 114 for the intake valves 105 are arranged in the deepest parts of the interiors of the corresponding depressions 113. Accordingly, when the intake valves 105 are seated on the valve seats 114, the intake valves 105 are retracted in the depressions 113. The peripheral wall portions of the depressions 113, which are located on the exhaust valve side, are arranged as close as possible to the peripheral portions of the corresponding intake ports 106 and have a semi-cylindrical shape, and thus these semi-cylindrical peripheral wall portions of the depressions 113 form masking walls 115 which cover the valve openings of the corresponding intake valves 105, which are located on the exhaust valve side. Conversely, peripheral wall portions 116 of the depressions 113, which are positioned opposite to the corresponding masking walls 115, have a conical shape which diverges toward the main combustion chamber 104.

Figure 4:
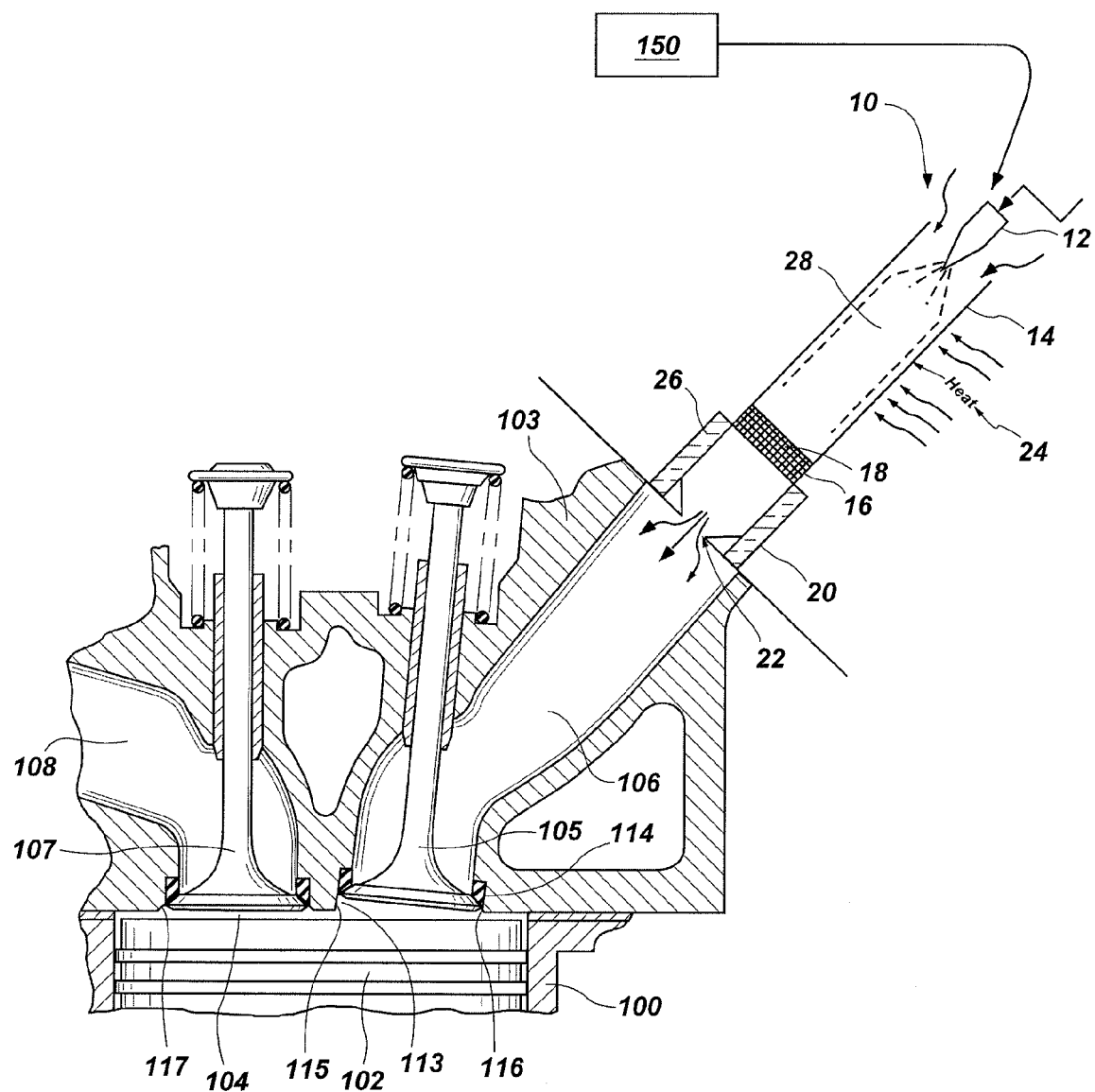
FIG. 4 is a cross-sectional side view of the two-stroke Diesel cycle engine, taken along section line Q-Q of FIG. 2.
Figure 5:
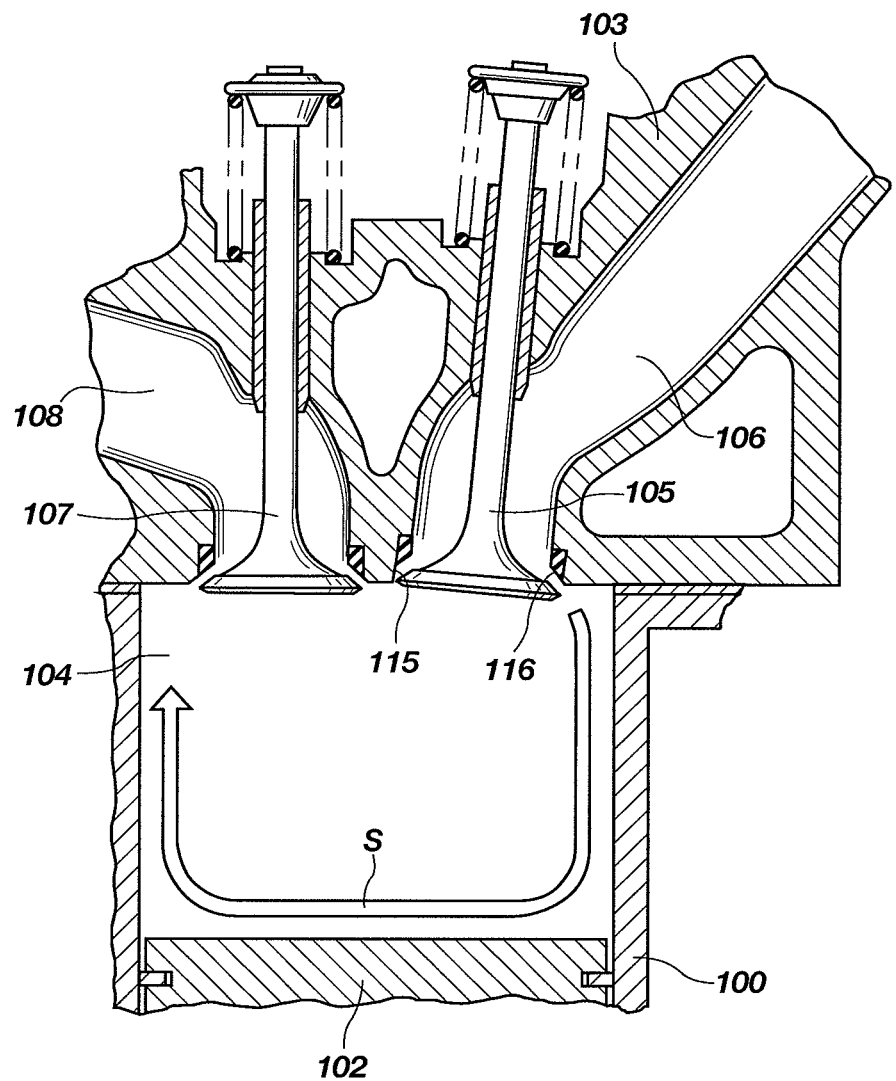
FIG. 5 is an enlarged cross-sectional side view of the two-stroke Diesel cycle engine, taken along section line Q-Q of FIG. 2.
Figure 9:
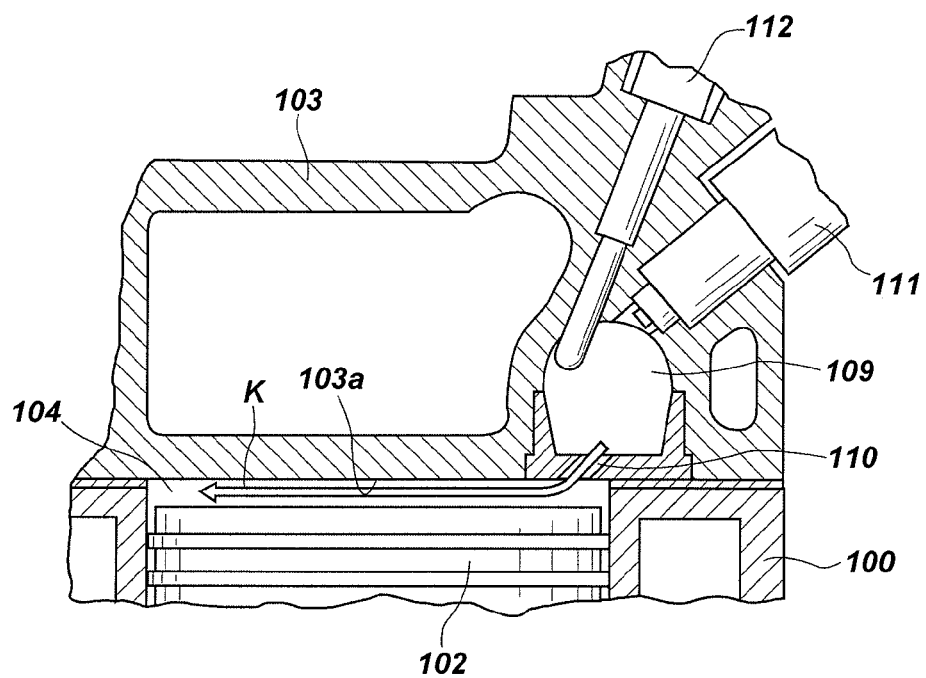
FIG. 9 is an enlarged cross-sectional side view of the engine, taken along the line P-P of FIG. 2.
Figure 10:
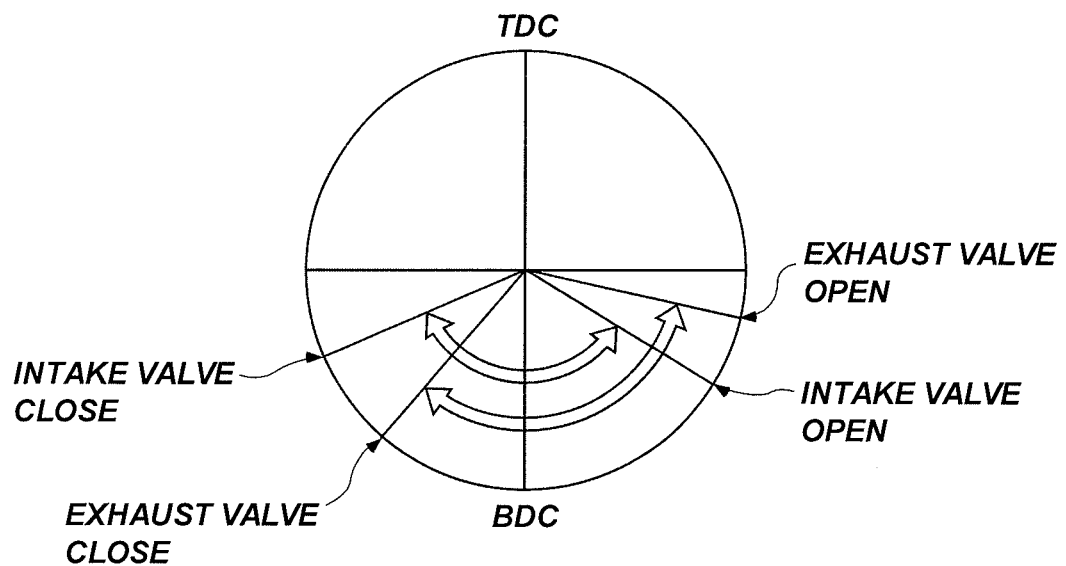
FIG. 10 is a diagram illustrating an opening time of an intake valve and an exhaust valve.

In the embodiment illustrated in FIGS. 2 through 4, as illustrated in FIG. 9, the exhaust valves 107 open may open earlier than the intake valves 105, and the exhaust valves 107 may close earlier than the intake valves 105, although the individual opening and closing of the intake and exhaust valves 105, 107, respectively may vary as desired with the engine design for the desired fuel. Further, as illustrated in FIG. 4, the fuel reformulation system 10 arrangement, as illustrated in FIG. 1, is installed in the intake port 106 to allow fuel to be injected into the intake port 106 and be decomposed or broken into smaller, lighter fragments, e.g., hydrogen and ethylene, for flowing into the main combustion chamber 104.

When the exhaust valves 107 are open, burned gas in the main combustion chamber 104 is abruptly discharged into the exhaust ports 108. Then, when the intake valves 105 are open, fresh air flows into the main combustion chamber 104 via the intake valves 105. At this time, since the valve openings of the intake valves 105, which openings are located on the exhaust valve side, are masked by the masking walls 115, the fresh air flows into the main combustion chamber 104 from the valve opening of the intake valves 105, which openings are located on the opposite side of the masking walls 115, along the semi-spherical peripheral wall portions 116. Then, as illustrated by arrows S in FIGS. 5 and 6, the fresh air flows downward along the inner wall 103a of the cylinder head 103, located beneath the intake valves 105 and then moves forward along the top face of the piston 102 and flows upward along the inner wall of the cylinder head 103, located beneath the exhaust valves 107. Thus, the fresh air flows within the main combustion chamber 104 in the form of a loop. The burned gas in the main combustion chamber 104 is discharged via the exhaust valves 107 by the air stream S flowing in the form of a loop manner.

Figure 7:
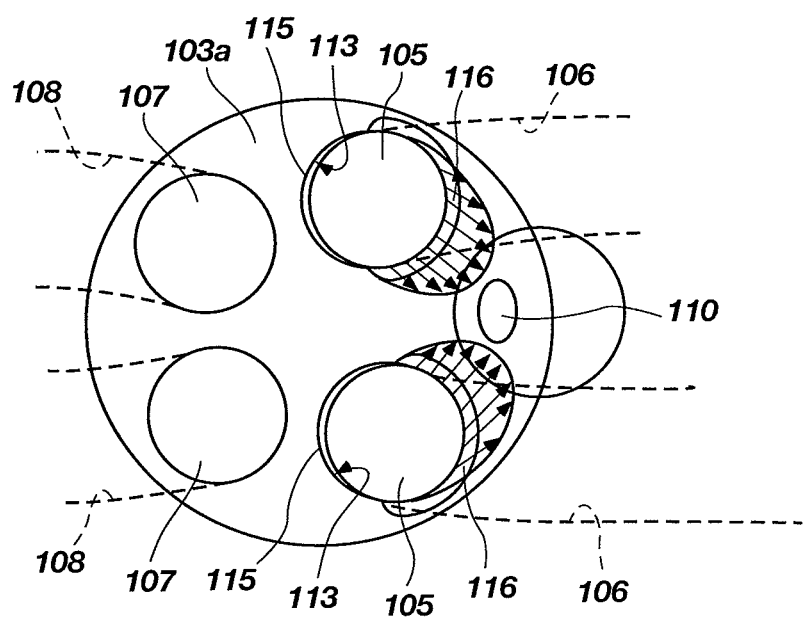
FIG. 7 is a view illustrating an inner wall of the cylinder head.

As can be seen from FIG. 3, the intake valves 105 are arranged on the peripheral portion of the inner wall 103a of the cylinder head 103 (FIG. 2) on each side of the opening 110 and therefore, if considering only the peripheral portions of the intake valves 105, which are located within the ranges of the semi-cylindrical peripheral wall portions 116, the peripheral portions of the intake valves 105, which are remote from the opening 110, are positioned closer to the peripheral end portion of the inner wall 103a of the cylinder head 103, compared with the peripheral portions of the intake valves 105, which are near the opening 110. As a result, fresh air flows easily into the main combustion chamber 104 from the valve openings of the intake valves 105, which are located near the opening 110, and thus the fresh air flowing into the main combustion chamber 104 from the intake ports 106 has a velocity distribution as illustrated the arrows in FIG. 7. Namely, the velocity component of the fresh air toward the opening 110 becomes maximum, and after the air streams having the maximum velocity component and flowing toward the opening 110 merge beneath the opening 110, the combined air streams move downward along the inner wall 103a of the cylinder head 103.

Figure 6:
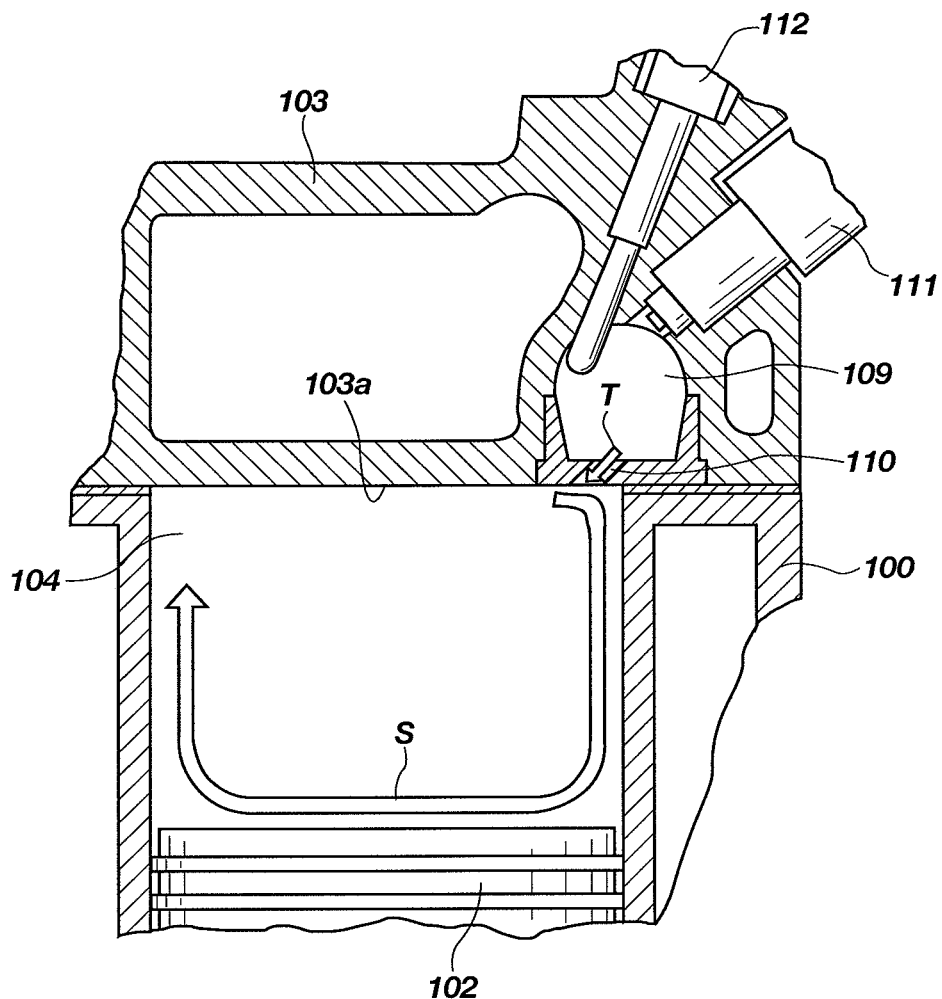
FIG. 6 is a cross-sectional side view of the two-stroke Diesel cycle engine, taken along section line P-P of FIG. 2.

As mentioned above, since the air streams having the maximum velocity component are merged beneath the opening 110 and then flow downward, burned gas in the prechamber 109 is effectively sucked out by these air streams, as illustrated by the arrow T in FIG. 6. Further, since the air streams flow downward along the inner wall 103a of the cylinder head 103 after being merged, almost only fresh air exists in the main chamber 4 beneath the opening 110, and accordingly, when the compression stroke is started, fresh air is forced into the prechamber 109 via the opening 110.

For increased flexibility in operation of the engine on different types of fuels, as illustrated in FIG. 4, with continued reference to FIG. 9, a fuel injector 12 of the fuel reformulation system 10 injects fuel into intake ports 106 for the fuel/air mixture to flow across catalytic screen member 18 in intake ports 106 for the decomposed fuel/air mixture to flow into the main combustion chamber 104 during the intake stroke. In this manner, by varying the valve time of the intake valves 105 for the main combustion chamber 104 and the prechamber 109 and varying the fuel injection timing and amount of fuel injected into the intake ports 106 for the main combustion chamber 104 and prechamber 109, the fuel/air mixture in the main combustion chamber 104 may be very lean while the fuel/air mixture in the prechamber 109 may vary between lean, stoichiometric, to rich, for good ignition and combustion characteristics of the fuel/air mixture therein with the combustion products from the prechamber 109 flowing from the prechamber 109 into the main combustion chamber 104 to ignite the fuel/air mixture therein. By using a lean fuel/air mixture in the main combustion chamber 104, the cetane rating of the fuel may be increased for enhanced performance from the engine.

Additionally, as illustrated in FIG. 4, a supercharger or turbo-charger 150 may be connected to the intake ports 106 upstream of the fuel injector 12 and catalytic screen member 18 to use the increased temperature of the air therefrom to increase both the vaporization of the fuel droplets from the fuel injector 12 and increase the reaction rate of the fuel/air mixture decomposition by the catalytic screen member 18 for an increase in the octane rating of the fuel for enhanced performance of the engine.

Fuel is injected from the fuel injector 111 toward the prechamber 109 at the beginning of the intake stroke, and this injected fuel is ignited by the glow plug 112 (FIG. 9), when the engine is cold, and burned in the prechamber 109 near the end of the compression stroke. As mentioned above, since fresh air is forced into the prechamber 109 when intake valve 105 opens and after burned gas in the prechamber 109 is sucked out, a large amount of air is fed into the prechamber 109, and, thus, the fuel injected into the prechamber 109 is easily ignited and properly burned in the prechamber 109.

Figure 8:
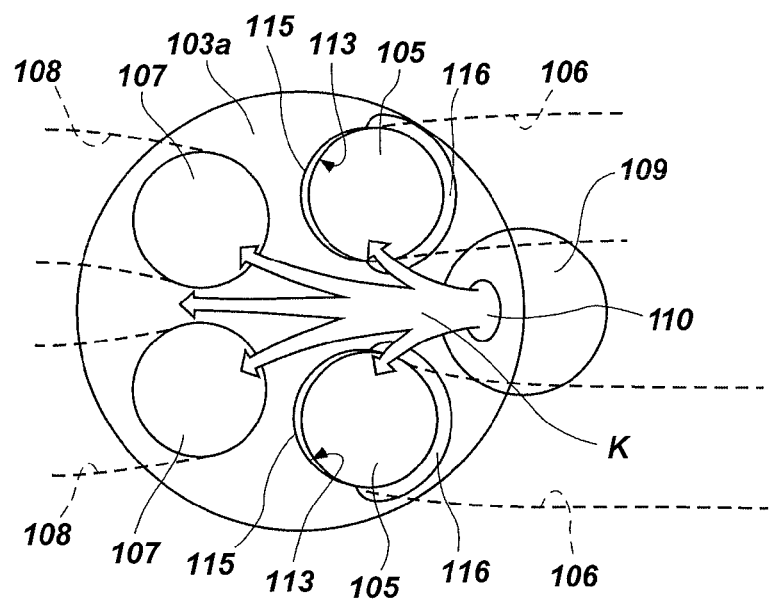
FIG. 8 is a view illustrating the inner wall of the cylinder head.

When the pressure in the prechamber 109 increases, burned and any unburned fuel/air mixture existing in the prechamber 109 near the opening 110 is pushed out from the opening 110 into the main combustion chamber 104, and then, as illustrated by K in FIG. 8, burning gas is spouted from the opening 110. The burned and any unburned fuel/air mixture and the burning gas pass between the top face of the piston 102 and the inner wall 103a of the cylinder head 103 and move forward between the exhaust valves 107 along the symmetrical plane a-a. Since the burned and any unburned air-fuel mixture and the burning gas move forward while slightly spreading in the lateral direction, after being spouted from the opening 110, a part of the unburned air-fuel mixture and a part of the burning gas flows into the depressions 113 beneath the exhaust valves 107, as illustrated in FIG. 8, and then any unburned fuel/air mixture, which has been mixed with air in the depressions 113, is ignited and burned by the burning gas. As can be seen from FIG. 8, since the distance between the intake valves 105 is large, a large part of any unburned fuel/air mixture and a large part of the burning gas moves forward to the exhaust valves 107 without being blocked by the masking walls 115. As illustrated in FIG. 4, when the exhaust valves 107 are closed, the exhaust valves 107 are slightly retracted from the inner wall 103a of the cylinder head 103, and accordingly, spaces 117 are created beneath the exhaust valves 107. Further, as illustrated in FIGS. 2 and 3, the distance between the exhaust valves 107 is small and accordingly, the unburned fuel/air mixture and the burning gas, moving toward the exhaust valves 107, flows into the spaces 117 (not visible in FIGS. 2 and 3, see FIG. 4) beneath the exhaust valves 107, and the unburned fuel/air mixture which has been mixed with air in the spaces 117 is ignited and burned by the burning gas. Consequently, since both the air in the depressions 113 beneath the intake valves 105 and the air in the spaces 117 beneath the exhaust valves 107 are used for the combustion, it is possible to obtain a high engine output.

Figure 11:
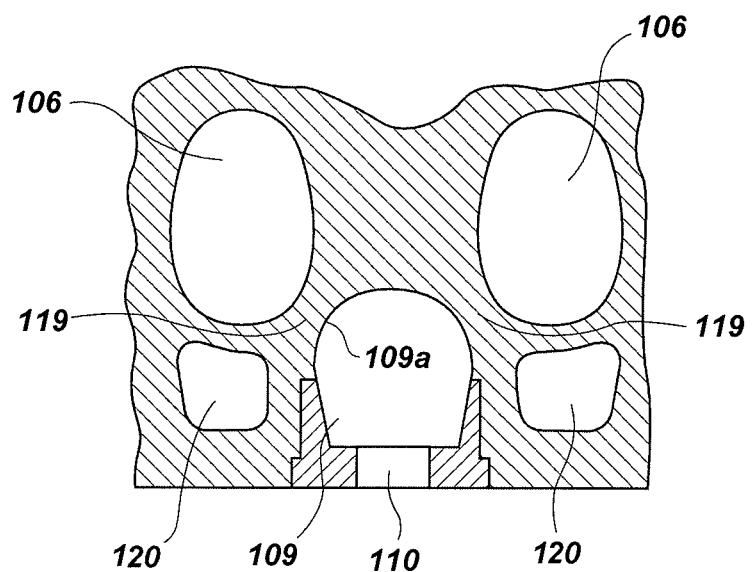
FIG. 11 is a cross-sectional view of the cylinder head, taken along section line X-X of FIG. 2.

Furthermore, as illustrated in FIG. 11, a pair of the intake ports 106 extends in the vicinity of the prechamber 109, and cooling water passages 120 are formed beneath the intake ports 106, respectively. Nevertheless, no cooling water passage is formed between the prechamber 109 and each of the intake ports 106; instead thin-walled solid cylinder head portions 119 exist between an upper wall portion 109a of the prechamber 109 and the intake ports 106. Consequently, since the inner walls of the intake ports 106 are strongly heated by the heat generated in the prechamber 109, fresh air flowing within the intake ports 106 is heated, and therefore, particularly when the engine is started when the temperature of the engine is low, it is possible to increase the vaporization of the injected fuel.

As mentioned above, according to the present invention, since fresh air is forced into the prechamber 109 after burned gas in the prechamber 109 is sucked out, it is possible to obtain a good ignition and burning in the prechamber 109.

Figure 12:
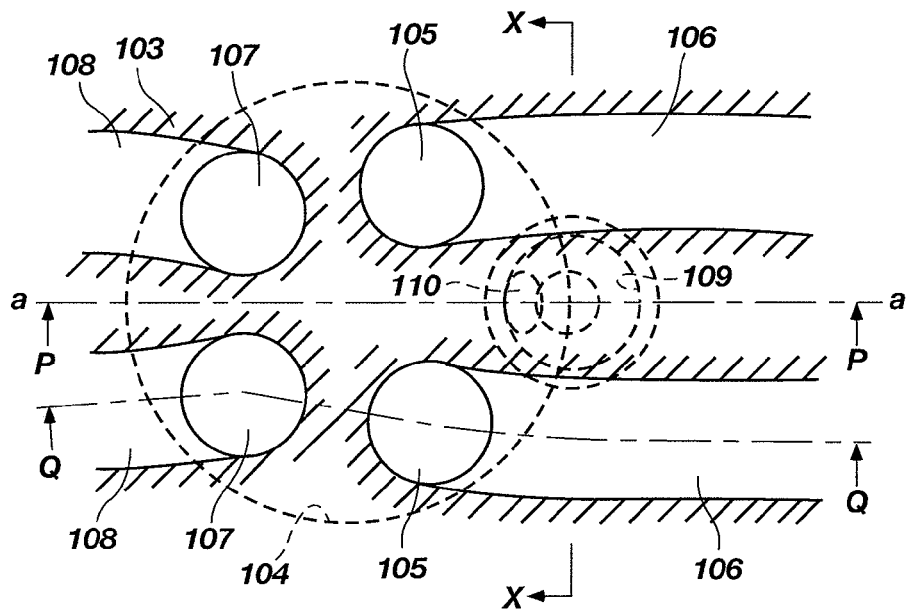
FIG. 12 is a cross-sectional plan view of a either two-stroke or four-stroke Otto cycle engine.
Figure 13:
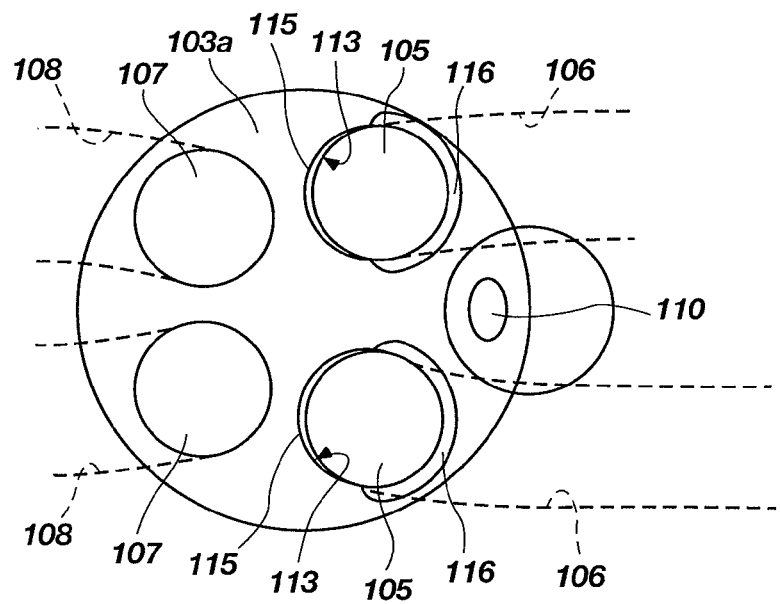
FIG. 13 is a view illustrating an inner wall of a cylinder head.

Referring to FIGS. 12 through 16, reference numeral 100 designates a cylinder block for a spark ignition internal combustion engine, 102 is a piston reciprocally movable in the cylinder block 100, 103 is a cylinder head fixed onto the cylinder block 100, and 104 is a main combustion chamber formed between the flat inner wall 103a of the cylinder head 103 and the flat top face of the piston 102; 105 designates a pair of intake valves, 106 designates intake ports, 107 designates a pair of exhaust valves, and 108 designates exhaust ports; 109 designates a prechamber, 110 is an opening of the prechamber 109, which is positioned on the same plane as the inner wall 103a of the cylinder head 103, 111 is a fuel injector for injecting fuel into the prechamber 109, and 112 is a glow plug arranged in the prechamber 109, as well as a spark plug 112'. As illustrated in FIGS. 12 and 13, a pair of the intake valves 105 are arranged on one side of the inner wall 103a of the cylinder head 103, symmetrically with respect to the symmetrical plane a-a including the axis of the cylinder head 103; and a pair of the exhaust valves 107 are arranged on the other side of the inner wall 103a of the cylinder head 103, symmetrically with respect to the symmetrical plane a-a. Further, as can be seen from FIGS. 12 and 13, the distance between the intake valves 105 is larger than the distance between the exhaust valves 107. In the embodiment illustrated in FIGS. 12 and 13, the distance between the intake valves 105 is considerably larger than the transverse width of the opening 110, and is approximately equal to the diameter of the prechamber 109. Conversely, the distance between the exhaust valves 107 is smaller than the transverse width of the opening 110. The opening 110 is arranged in the peripheral portion of the inner wall 103a of the cylinder head 103, which portion is farthest from the exhaust valves 107, between the intake valves 105. Further, the opening 110 is arranged on the symmetrical plane a-a, and directed toward the central portion of the main combustion chamber 104 along the symmetrical plane a-a.

A pair of depressions 113 is formed in the inner wall 103a of the cylinder head 103, and valve seats 114 for the intake valves 105 are arranged in the deepest parts of the interiors of the corresponding depressions 113. Accordingly, when the intake valves 105 are seated on the valve seats 114, the intake valves 105 are retracted in the depressions 113. The peripheral wall portions of the depressions 113, which are located on the exhaust valve side, are arranged as close as possible to the peripheral portions of the corresponding intake ports 106 and have a semi-cylindrical shape, and, thus, these semi-cylindrical peripheral wall portions of the depressions 113 form masking walls 115 which cover the valve openings of the corresponding intake valves 105, which are located on the exhaust valve side. Conversely, the peripheral wall portions 116 of the depressions 113, which are positioned opposite to the corresponding masking walls 115, have a conical shape which diverges toward the main combustion chamber 104.

Figure 14:
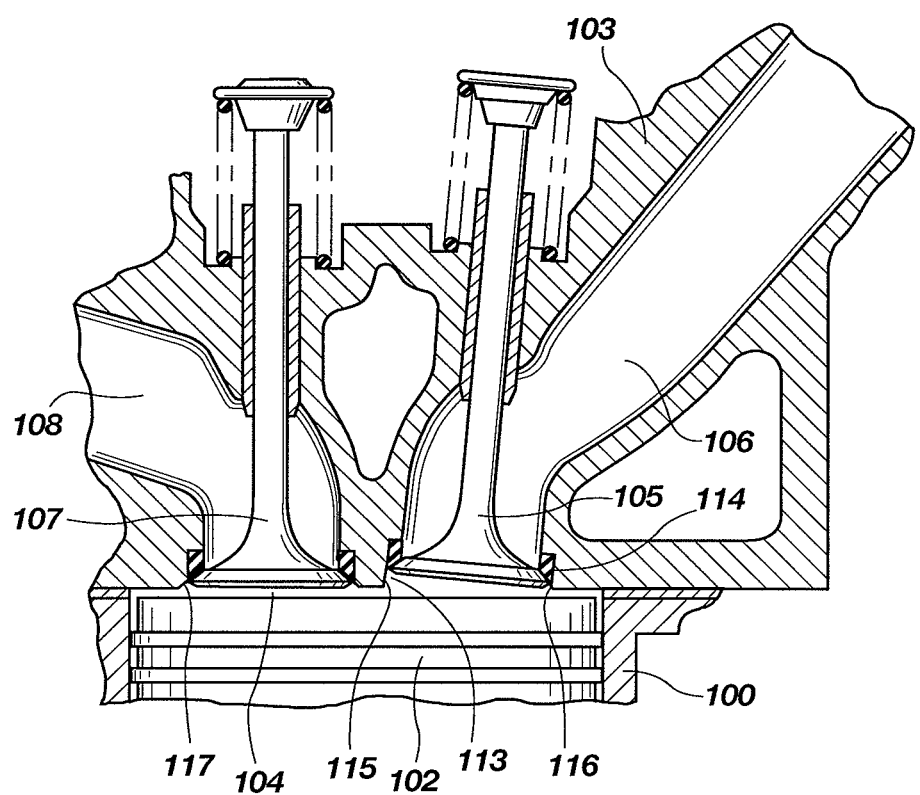
FIG. 14 is a cross-sectional side view of the four-stroke Otto cycle engine, taken along section line Q-Q of FIG. 12.
Figure 19:
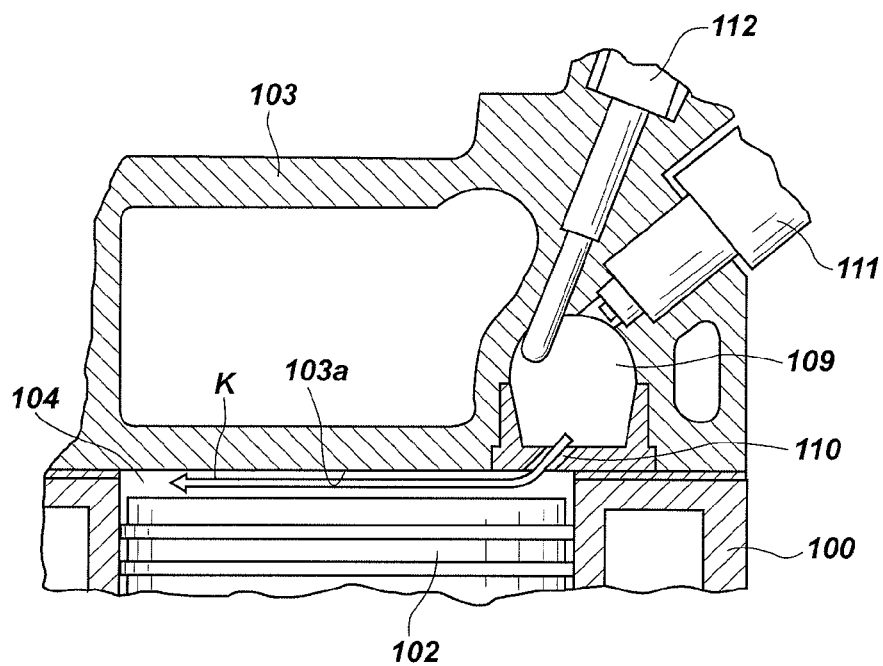
FIG. 19 is an enlarged cross-sectional side view of the four-stroke Otto cycle engine, taken along section line P-P of FIG. 12.
Figure 20:
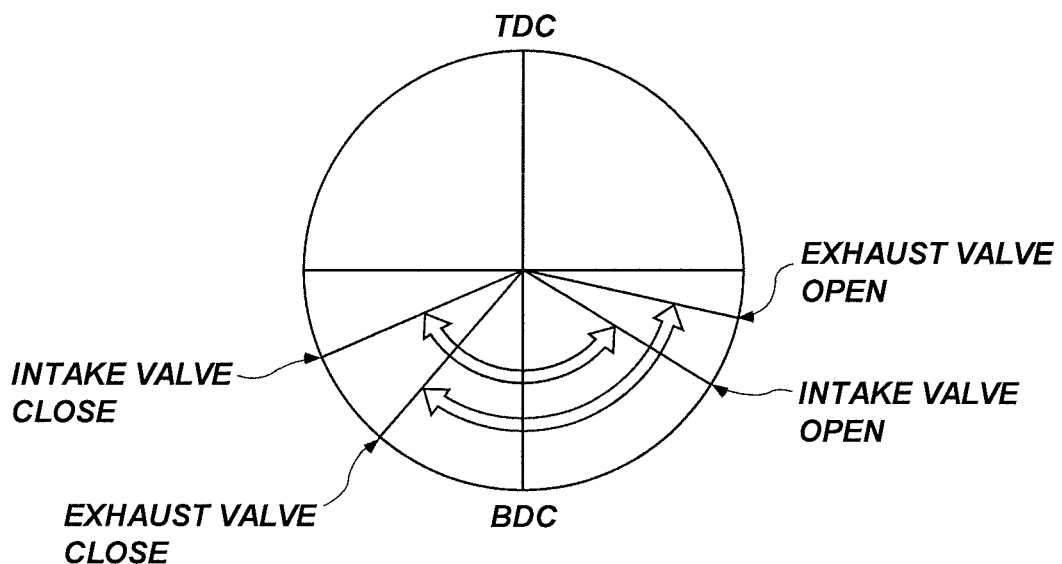
FIG. 20 is a diagram illustrating an opening time of an intake valve and an exhaust valve.

In the embodiment illustrated in FIGS. 12 through 14, as illustrated in FIG. 19, the exhaust valves 107 open may open earlier than the intake valves 105, and the exhaust valves 107 may close earlier than the intake valves 105, although the individual opening and closing of the intake and exhaust valves 105, 107, respectively, may vary as desired with the engine design for the desired fuel.

When the exhaust valves 107 are open, burned gas in the main combustion chamber 104 is abruptly discharged into the exhaust ports 108. Then, when the intake valves 105 are open, fresh air flows into the main combustion chamber 104 via the intake valves 105. At this time, since the valve openings of the intake valves 105, which openings are located on the exhaust valve side, are masked by the masking walls 115, the fresh air flows into the main combustion chamber 104 from the valve opening of the intake valves 105, which openings are located on the opposite side of the masking walls 115, along the semi-spherical peripheral wall portions 116. Then, as illustrated by the arrows S in FIGS. 15 and 16, the fresh air flows downward along the inner wall 103a of the cylinder head 103, located beneath the intake valves 105 and then moves forward along the top face of the piston 102 and flows upward along the inner wall 103a of the cylinder head 103, located beneath the exhaust valves 107. Thus, the fresh air flows within the main combustion chamber 104 in the form of a loop. The burned gas in the main combustion chamber 104 is discharged via the exhaust valves 107 by the air stream S flowing in the form of a loop manner.

Figure 17:
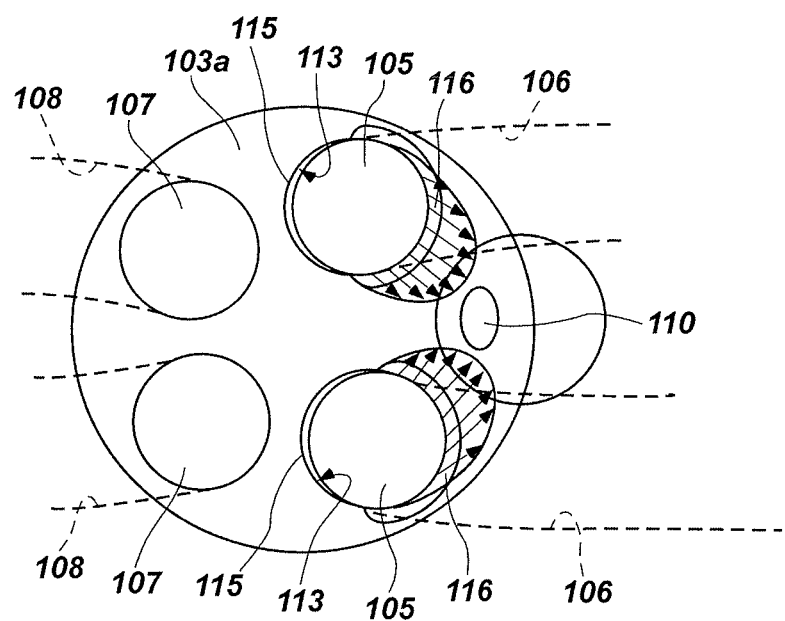
FIG. 17 is a view illustrating the inner wall of the cylinder head.

As can be seen from FIG. 13, the intake valves 105 are arranged on the peripheral portion of the inner wall 103a of the cylinder head 103 on each side of the opening 110 and therefore, if considering only the peripheral portions of the intake valves 105, which are located within the ranges of the semi-cylindrical peripheral wall portions 116, the peripheral portions of the intake valves 105, which are remote from the opening 110, are positioned closer to the peripheral end portion of the inner wall 103a of the cylinder head 103, compared with the peripheral portions of the intake valves 105, which are near the opening 110. As a result, fresh air flows easily into the main combustion chamber 104 from the valve openings of the intake valves 105, which are located near the opening 110, and thus the fresh air flowing into the main combustion chamber 104 from the intake ports 106 has a velocity distribution as illustrated by arrows in FIG. 17. Namely, the velocity component of the fresh air toward the opening 110 becomes maximum and after the air streams having the maximum velocity component and flowing toward the opening 110 merge beneath the opening 110, the combined air streams move downward along the inner wall 103a of the cylinder head 103.

Figure 15:
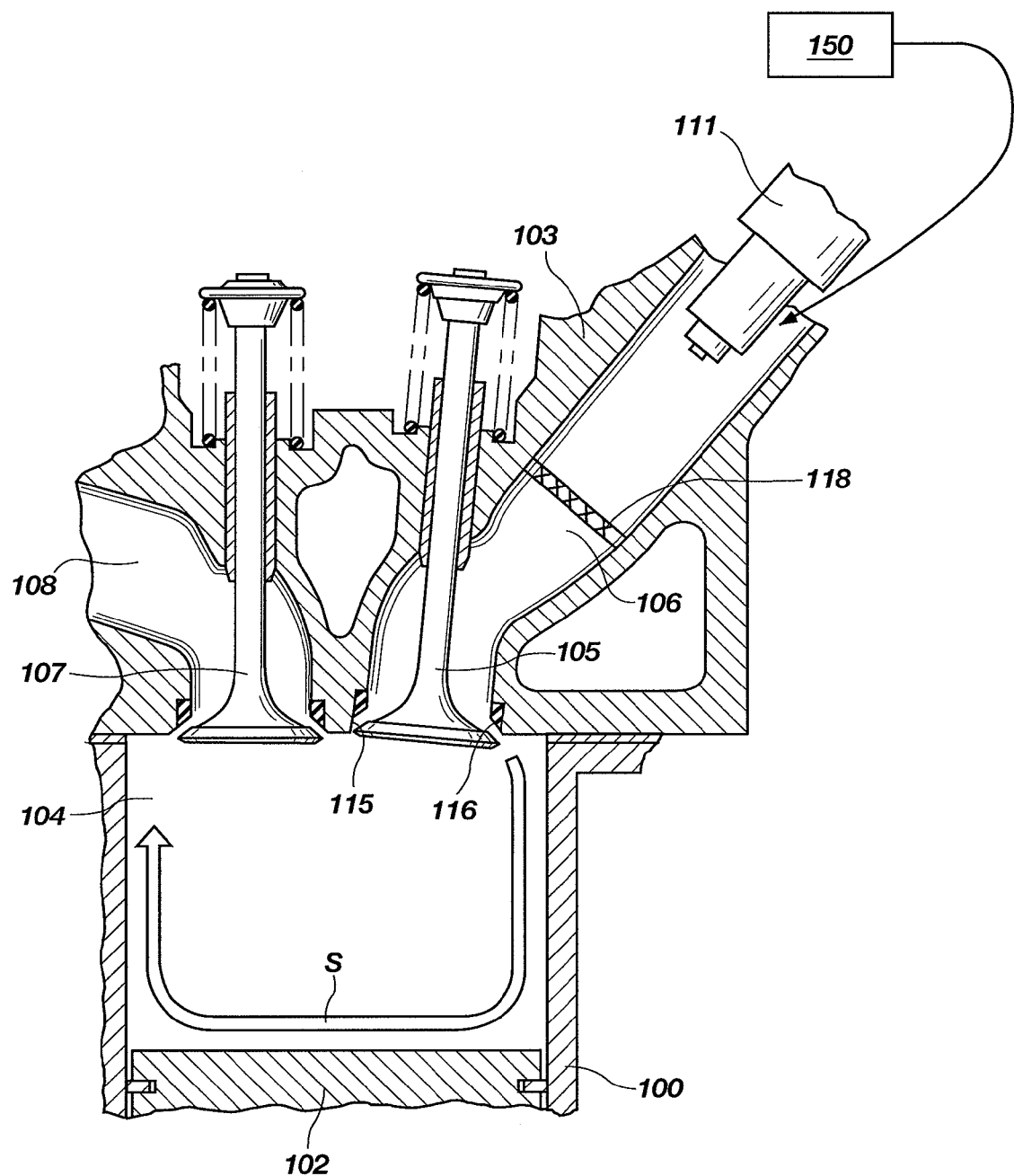
FIG. 15 is an enlarged cross-sectional side view of the four-stroke Otto cycle engine, taken along section line Q-Q of FIG. 12.
Figure 16:
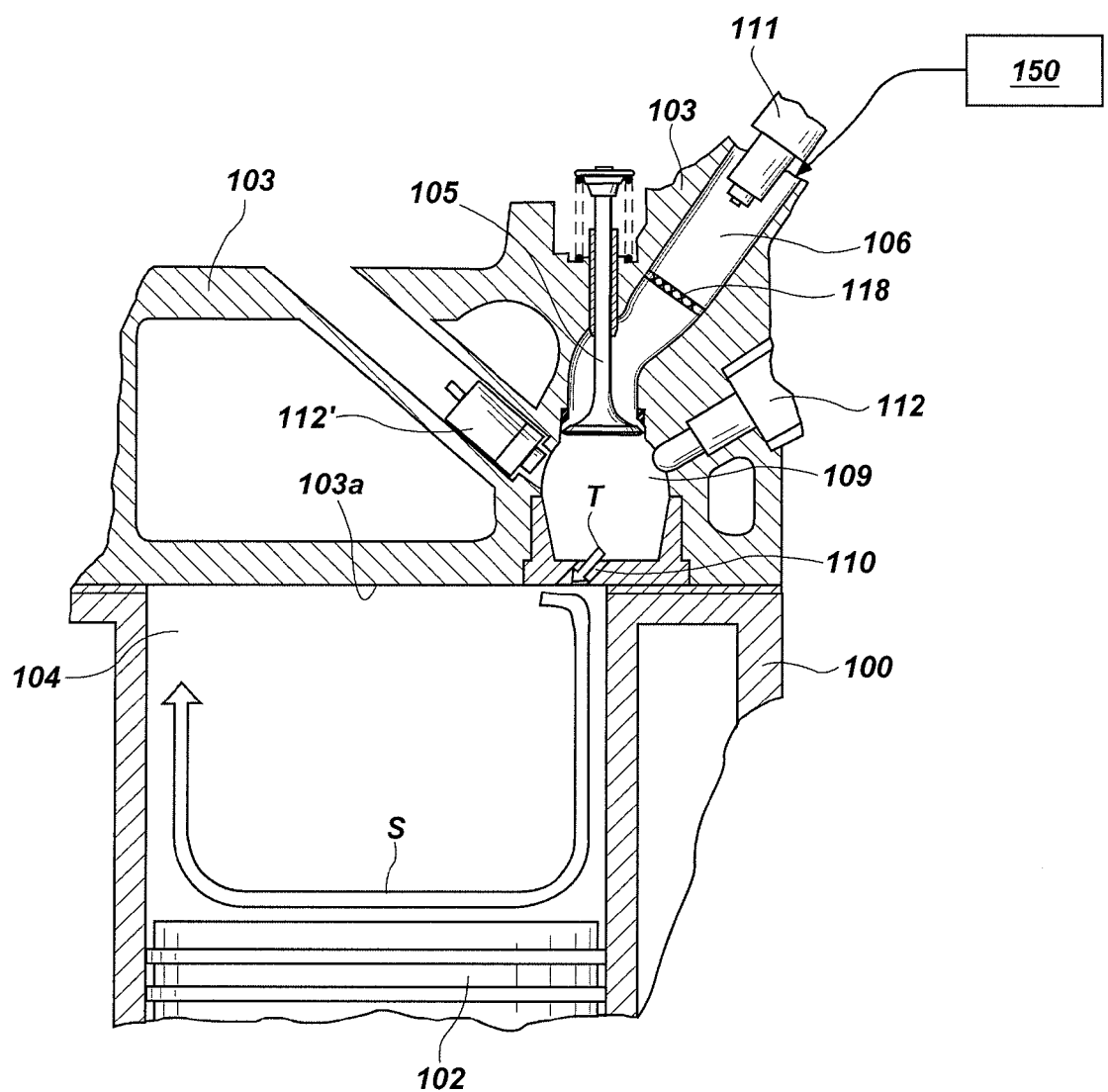
FIG. 16 is a cross-sectional side view of the four-stroke Otto cycle engine, taken along section line P-P of FIG. 12.

As mentioned above, since the air streams having the maximum velocity component are merged beneath the opening 110 and then flow downward, burned gas in the prechamber 109 is effectively sucked out by these air streams, as illustrated by an arrow T in FIG. 16. Further, since the air streams flow downward along the inner wall of the cylinder after being merged, almost only fresh air exists in the main combustion chamber 104 beneath the opening 110, and accordingly, when the compression stroke is started, fresh air is forced into the prechamber 109 via the opening 110. Additionally, as illustrated in FIG. 16 prechamber 109 includes an intake valve 105 therein for a fuel/air mixture to flow into the prechamber 109 through intake port 106 across catalytic screen 118 after fuel has been injected by fuel injector 111 into intake port 106. As the fuel/air mixture flows across the catalytic screen 118, the fuel precious metal coating on the catalytic screen 118 causes the decomposition of the fuel/air mixture into various elements, such as hydrogen, carbon monoxide, and long chain hydrocarbons. Since the intake port 106 has an elevated temperature when the engine is operating, the reaction rate of the decomposition of the fuel/air mixture increases. Since the fuel/air mixture has decomposed into various elements, the fuel/air mixture combusts more readily allowing the use of different types of fuels in the engine. Further, for increased flexibility in operation of the engine on different types of fuels, as illustrated in FIG. 15. A fuel injector 111 injects fuel in intake ports 106 for the fuel/air mixture to flow across catalytic screen 118 in intake ports 106 for the decomposed fuel/air mixture to flow into the main combustion chamber 104 during the intake stroke. In this manner, by varying the valve time of the intake valves 105 for the main combustion chamber 104 and the prechamber 109 and varying the fuel injection timing and amount of fuel injected into the intake ports 106 for the main combustion chamber 104 and prechamber 109, the fuel/air mixture in the main combustion chamber 104 may be very lean while the fuel/air mixture in the prechamber 109 may vary between lean, stoichiometric, to rich, for good ignition and combustion characteristics of the fuel/air mixture therein with the combustion products from the prechamber 109 flowing from the prechamber 109 into the main combustion chamber 104 to ignite the fuel/air mixture therein. By using a lean fuel/air mixture in the main combustion chamber 104, the octane rating of the fuel may be increased for enhanced performance from the engine.

Additionally, as illustrated in FIGS. 15 and 16, a supercharger or turbo-charger 150 may be connected to the intake ports 106 upstream of the fuel injector 111 and catalytic screen 118 to use the increased temperature of the air therefrom to increase both the vaporization of the fuel droplets from the fuel injector 111 and increase the reaction rate of the fuel/air mixture decomposition by the catalytic screen 118 for an increase in the octane rating of the fuel for enhanced performance of the engine.

Fuel is injected from the fuel injector 111 toward the prechamber 109 at the beginning of the intake stroke, and this injected fuel is ignited by either the glow plug 112 and the spark plug 112', when the engine is cold, or the spark plug 112' when the engine is warm and burned in the prechamber 109 near the end of the compression stroke. While any type spark ignition system may be used, for multi-fuel applications an inductive ignition system is preferred over a capacitive discharge-type ignition system as the inductive ignition system discharges energy continuously into the fuel/air mixture as opposed to the multiple strike discharge strategy of a capacitive discharge-type ignition system. As mentioned above, since fresh air is forced into the prechamber 109 when intake valve 105 opens and after burned gas in the prechamber 109 is sucked out, a large amount of air is fed into the prechamber 109, and thus the fuel injected into the prechamber 109 is easily ignited and properly burned in the prechamber 109.

Figure 18:
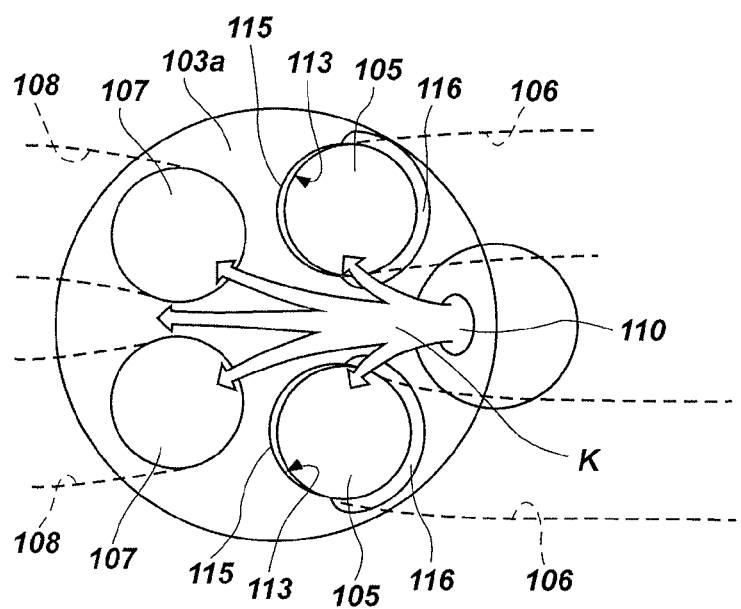
FIG. 18 is a view illustrating the inner wall of the cylinder head.

When the pressure in the prechamber 109 increases, burned and any unburned fuel/air mixture existing in the prechamber 109 near the opening 110 is pushed out from the opening 110 into the main combustion chamber 104, and then, as illustrated by K in FIG. 18, burning gas is spouted from the opening 110. The burned and any unburned fuel/air mixture and the burning gas pass between the top face of the piston 102 and the inner wall 103a of the cylinder head 103 and move forward between the exhaust valves 107 along the symmetrical plane a-a. Since the burned and any unburned air-fuel mixture and the burning gas move forward while slightly spreading in the lateral direction, after being spouted from the opening 110, a part of the unburned air-fuel mixture and a part of the burning gas flows into the depressions 113 beneath the exhaust valves 107, as illustrated in FIG. 18, and then any unburned fuel/air mixture, which has been mixed with air in the depressions 113, is ignited and burned by the burning gas. As can be seen from FIG. 18, since the distance between the intake valves 105 is large, a large part of any unburned fuel/air mixture and a large part of the burning gas moves forward to the exhaust valves 107 without being blocked by the masking walls 115. As illustrated in FIG. 14, when the exhaust valves 107 are closed, the exhaust valves 107 are slightly retracted from the inner wall 103a of the cylinder head 103, and accordingly, spaces 117 are created beneath the exhaust valves 107. Further, as illustrated in FIGS. 12 and 13, the distance between the exhaust valves 107 is small and accordingly, the unburned fuel/air mixture and the burning gas, moving toward the exhaust valves 107, flows into the spaces 117 (not visible in FIGS. 12 and 13; see FIG. 14) beneath the exhaust valves 107, and the unburned fuel/air mixture which has been mixed with air in the spaces 117 is ignited and burned by the burning gas. Consequently, since both the air in the depressions 113 beneath the intake valves 105 and the air in the spaces 117 beneath the exhaust valves 107 are used for the combustion, it is possible to obtain a high engine output.

Figure 21:
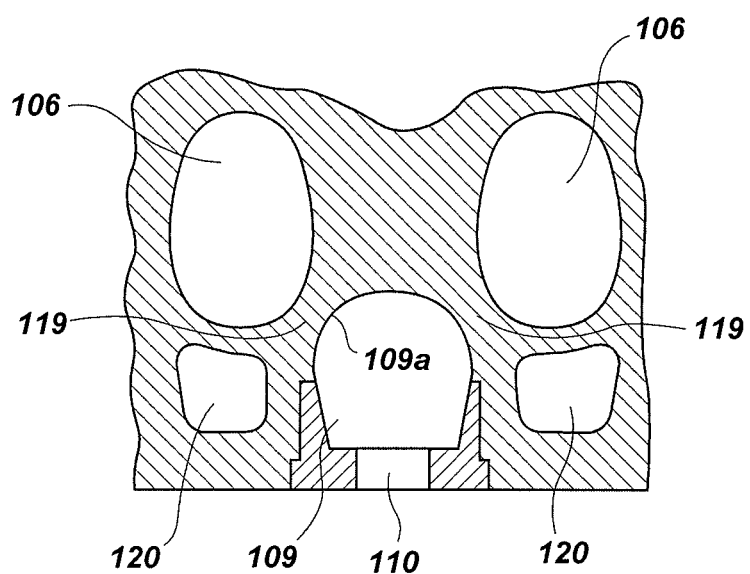
FIG. 21 is a cross-sectional view of the cylinder head, taken along section line X-X of FIG. 12.
Figure 22:
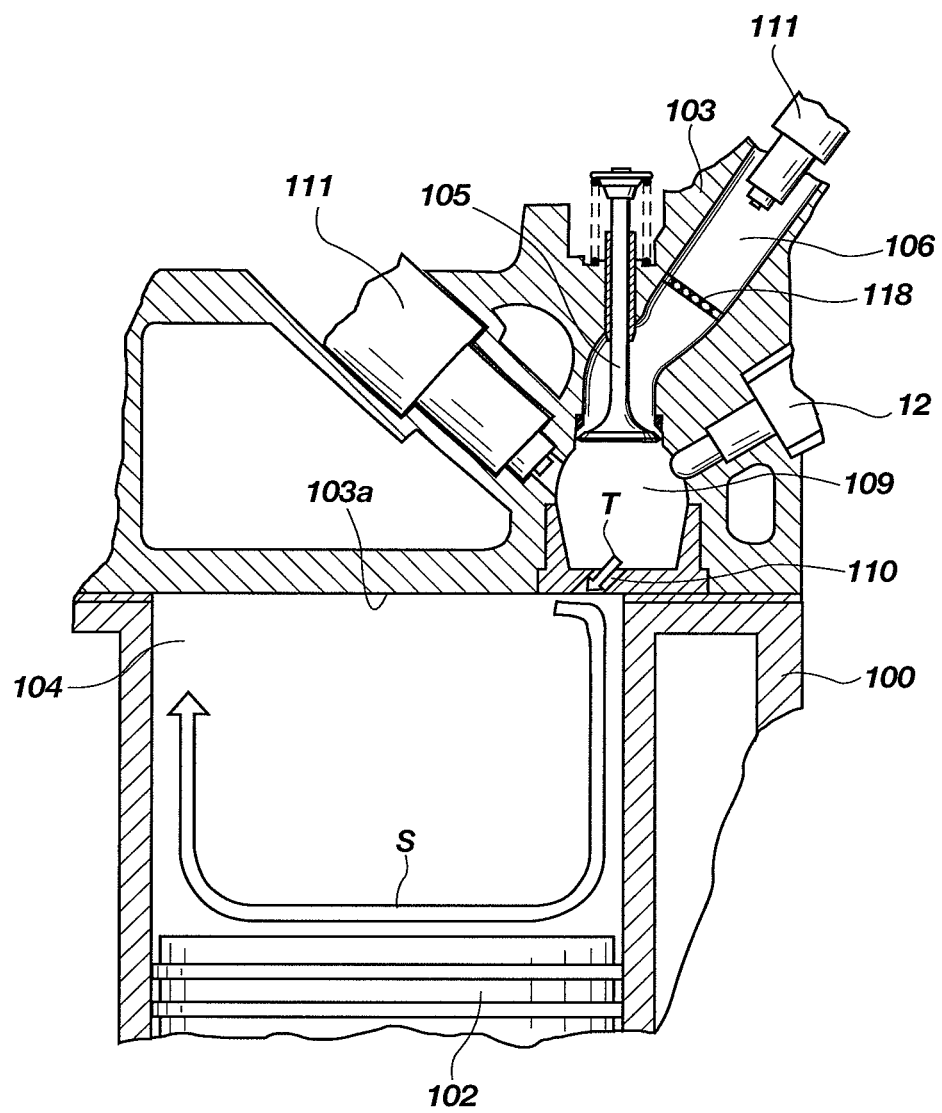
FIG. 22 is a cross-sectional plan view of a two-stroke or four-stroke Diesel cycle engine.
Figure 23:
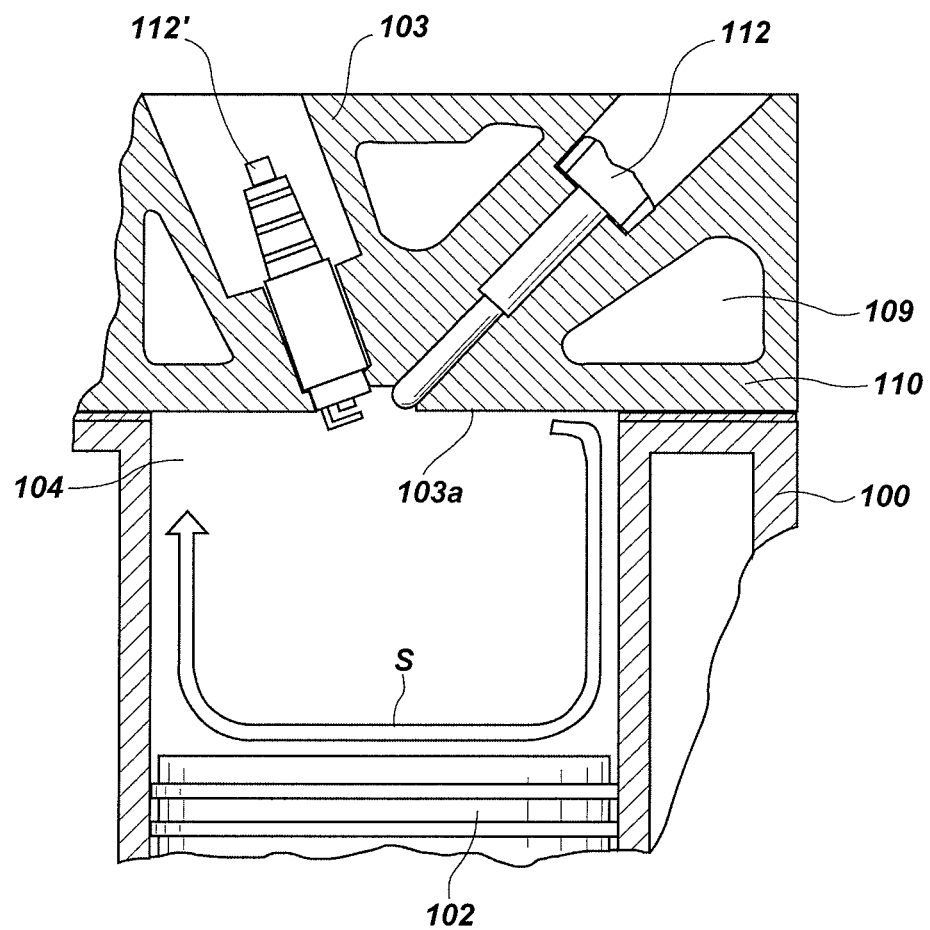
FIG. 23 is a cross-sectional plan view of a two-stroke or four-stroke Otto cycle engine.

Furthermore, as illustrated in FIG. 21, a pair of the intake ports 106 extends in the vicinity of the prechamber 109, and cooling water passages 118 are formed beneath the intake ports 106, respectively. Nevertheless, no cooling water passage is formed between the prechamber 109 and each of the intake ports 106; instead thin-walled solid cylinder head portions 119 exist between the upper wall portion 109a of the prechamber 109 and the intake ports 106. Consequently, since the inner walls of the intake ports 106 are strongly heated by the heat generated in the prechamber 109, fresh air flowing within the intake ports 106 is heated, and therefore, particularly when the engine is started when the temperature of the engine is low, it is possible to increase the vaporization of the injected fuel.

As mentioned above, according to the present invention, since fresh air is forced into the prechamber 109 after burned gas in the prechamber 109 is sucked out, it is possible to obtain a good ignition and burning in the prechamber 109.

As illustrated in FIG. 22, FIGS. 12 through 15 and FIGS. 17 through 21, reference numeral 100 designates a cylinder block for a compression ignition internal combustion engine, 102 is a piston reciprocally movable in the cylinder block 100, 103 is a cylinder head fixed onto the cylinder block 100, and 104 is a main combustion chamber formed between the flat inner wall 103a of the cylinder head 103 and the flat top face of the piston 102; 105 designates a pair of intake valves, 106 designates intake ports, 107 designates a pair of exhaust valves, and 108 designates exhaust ports; 109 designates a prechamber, 110 is an opening of the prechamber 109, which is positioned on the same plane as the inner wall 103a of the cylinder head 103, 111 is a fuel injector for injecting fuel into the prechamber 109, and 112 is a glow plug arranged in the prechamber 109 for igniting the fuel/air mixture therein. As illustrated in FIGS. 12 and 2 through 5, a pair of the intake valves 105 are arranged on one side of the inner wall 103a of the cylinder head 103, symmetrically with respect to the symmetrical plane a-a including the axis of the cylinder head 103; and a pair of the exhaust valves 107 are arranged on the other side of the inner wall 103a of the cylinder head 103, symmetrically with respect to the symmetrical plane a-a. Further, as can be seen from FIGS. 12 and 13, the distance between the intake valves 105 is larger than the distance between the exhaust valves 107. In the embodiment illustrated in FIGS. 12 and 13, the distance between the intake valves 105 is considerably larger than the transverse width of the opening 110, and is approximately equal to the diameter of the prechamber 109. Conversely, the distance between the exhaust valves 107 is smaller than the transverse width of the opening 110. The opening 110 is arranged in the peripheral portion of the inner wall 103a of the cylinder head 103, which portion is farthest from the exhaust valves 107, between the intake valves 105. Further, the opening 110 is arranged on the symmetrical plane a-a, and directed toward the central portion of the main combustion chamber 104 along the symmetrical plane a-a.

A pair of depressions 113 is formed in the inner wall 103a of the cylinder head 103, and valve seats 114 for the intake valves 105 are arranged in the deepest parts of the interiors of the corresponding depressions 113. Accordingly, when the intake valves 105 are seated on the valve seats 114, the intake valves 105 are retracted in the depressions 113. The peripheral wall portions of the depressions 113, which are located on the exhaust valve side, are arranged as close as possible to the peripheral portions of the corresponding intake ports 106 and have a semi-cylindrical shape, and thus these semi-cylindrical peripheral wall portions of the depressions 113 form masking walls 115 which cover the valve openings of the corresponding intake valves 105, which are located on the exhaust valve side. Conversely, the peripheral wall portions 116 of the depressions 113, which are positioned opposite to the corresponding masking walls 115, have a conical shape which diverges toward the main combustion chamber 104.

In the embodiment illustrated in FIGS. 12 through 14, as illustrated in FIG. 19, the exhaust valves 107 open may open earlier than the intake valves 105, and the exhaust valves 107 may close earlier than the intake valves 105, although the individual opening and closing of the intake and exhaust valves 105, 107, respectively, may vary as desired with the engine design for the desired fuel.

When the exhaust valves 107 are open, burned gas in the main combustion chamber 104 is abruptly discharged into the exhaust ports 108. Then, when the intake valves 105 are open, fresh air flows into the main combustion chamber 104. At this time, since the valve openings of the intake valves 105, which openings are located on the exhaust valve side, are masked by the masking walls 115, the fresh air flows into the main combustion chamber 104 from the valve opening of the intake valves 105, which openings are located on the opposite side of the masking walls 115, along the semi-spherical peripheral wall portions 116. Then, as illustrated by the arrows S in FIGS. 15 and 16, the fresh air flows downward along the inner wall 103a of the cylinder head 103, located beneath the intake valves 105 and then moves forward along the top face of the piston 102 and flows upward along the inner wall 103a of the cylinder head 103, located beneath the exhaust valves 107. Thus, the fresh air flows within the main combustion chamber 104 in the form of a loop. The burned gas in the main combustion chamber 104 is discharged via the exhaust valves 107 by the air stream S flowing in the form of a loop manner.

As can be seen from FIG. 13, the intake valves 105 are arranged on the peripheral portion of the inner wall 103a of the cylinder head 103 on each side of the opening 110 and therefore, if considering only the peripheral portions of the intake valves 105, which are located within the ranges of the semi-cylindrical peripheral wall portions 116, the peripheral portions of the intake valves 105, which are remote from the opening 110, are positioned closer to the peripheral end portion of the inner wall 103a of the cylinder head 103, compared with the peripheral portions of the intake valves 105, which are near the opening 110. As a result, fresh air flows easily into the main combustion chamber 104 from the valve openings of the intake valves 105, which are located near the opening 110, and, thus, the fresh air flowing into the main combustion chamber 104 from the intake ports 106 has a velocity distribution as illustrated by the arrows in FIG. 17. Namely, the velocity component of the fresh air toward the opening 110 becomes maximum, and after the air streams having the maximum velocity component and flowing toward the opening 110 merge beneath the opening 110, the combined air streams move downward along the inner wall 103a of the cylinder head 103.

As mentioned above, since the air streams having the maximum velocity component are merged beneath the opening 110 and then flow downward, burned gas in the prechamber 109 is effectively sucked out by these air streams, as illustrated by the arrow T in FIG. 16. Further, since the air streams flow downward along the inner wall 103a of the cylinder head 103 after being merged, almost only fresh air exists in the main combustion chamber 104 beneath the opening 110, and accordingly, when the compression stroke is started, fresh air is forced into the prechamber 109 via the opening 110. Additionally, as illustrated in FIG. 16, prechamber 109 includes the intake valve 105 therein for a fuel/air mixture to flow into the prechamber 109 through intake port 106 across catalytic screen 118 after fuel has been injected by fuel injector 111 into intake port 106. As the fuel/air mixture flows across the catalytic screen 118, the fuel precious metal coating on the catalytic screen 118 causes the decomposition of the fuel/air mixture into various elements, such as hydrogen, carbon monoxide, and long chain hydrocarbons. Since the intake port 106 has an elevated temperature when the engine is operating, the reaction rate of the decomposition of the fuel/air mixture increases. Since the fuel/air mixture has decomposed into various elements, the fuel/air mixture combusts more readily thereby allowing the use of different types of fuels in the engine. Further, for increased flexibility in operation of the engine on different types of fuels, as illustrated in FIG. 15. A fuel injector 111 injects fuel in intake ports 106 for the fuel/air mixture to flow across catalytic screen 118 in the intake ports 106 for the decomposed fuel/air mixture to flow into the main combustion chamber 104 during the intake stroke. In this manner, by varying the valve time of the intake valves 105 for the main combustion chamber 104 and the prechamber 109 and varying the fuel injection timing and amount of fuel injected into the intake ports 106 for the main combustion chamber 104 and prechamber 109 the fuel/air mixture in the main combustion chamber 104 may be very lean while the fuel/air mixture in the prechamber 109 may vary between lean, stoichiometric, to rich, for good ignition and combustion characteristics of the fuel/air mixture therein with the combustion products from the prechamber 109 flowing from the prechamber 109 into the main combustion chamber 104 to ignite the fuel/air mixture therein. By using a lean fuel/air mixture in the main combustion chamber 104, the octane rating of the fuel may be increased for enhanced performance from the engine.

Additionally, as illustrated in FIGS. 15 and 16, a supercharger or turbo-charger 150 may be connected to the intake ports 106 upstream of the fuel injectors 111 and catalytic screen 118 to use the increased temperature of the air form the supercharger of turbo-charger 150 to increase both the vaporization of the fuel droplets from the fuel injectors 111 and increase the reaction rate of the fuel/air mixture decomposition by the catalytic screen 118 for an increase in the octane rating of the fuel for enhanced performance of the engine.

Fuel is injected from the fuel injector 111 toward the prechamber 109 at the beginning of the intake stroke, and this injected fuel is ignited by the glow plug 112, when the engine is cold, and burned in the prechamber 109 near the end of the compression stroke. As mentioned above, since fresh air is forced into the prechamber 109 when intake valve 105 opens and after burned gas in the prechamber 109 is sucked out, a large amount of air is fed into the prechamber 109, and thus the fuel injected into the prechamber 109 is easily ignited and properly burned in the prechamber 109.

When the pressure in the prechamber 109 increases, burned and any unburned fuel/air mixture existing in the prechamber 109 near the opening 110 is pushed out from the opening 110 into the main combustion chamber 104, and then, as illustrated by K in FIG. 18, burning gas is spouted from the opening 110. The burned and any unburned fuel/air mixture and the burning gas pass between the top face of the piston 102 and the inner wall 103a of the cylinder head 103 and move forward between the exhaust valves 107 along the symmetrical plane a-a. Since the burned and any unburned air-fuel mixture and the burning gas move forward while slightly spreading in the lateral direction, after being spouted from the opening 110, a part of the unburned air-fuel mixture and a part of the burning gas flows into the depressions 113 beneath the exhaust valves 107, as illustrated in FIG. 18, and then any unburned fuel/air mixture, which has been mixed with air in the depressions 113, is ignited and burned by the burning gas. As can be seen from FIG. 18, since the distance between the intake valves 105 is large, a large part of any unburned fuel/air mixture and a large part of the burning gas moves forward to the exhaust valves 107 without being blocked by the masking walls 115. As illustrated in FIG. 14, when the exhaust valves 107 are closed, the exhaust valves 107 are slightly retracted from the inner wall 103a of the cylinder head 103, and accordingly, spaces 117 are created beneath the exhaust valves 107. Further, as illustrated in FIGS. 12 and 13, the distance between the exhaust valves 107 is small and accordingly, the unburned fuel/air mixture and the burning gas, moving toward the exhaust valves 107, flows into the spaces 117 (not visible in FIGS. 12 and 13. see FIG. 14) beneath the exhaust valves 107, and the unburned fuel/air mixture which has been mixed with air in the spaces 117 is ignited and burned by the burning gas. Consequently, since both the air in the depressions 113 beneath the intake valves 105 and the air in the spaces 117 beneath the exhaust valves 107 are used for the combustion, it is possible to obtain a high engine output.

Furthermore, as illustrated in FIG. 21, a pair of the intake ports 106 extends in the vicinity of the prechamber 109, and cooling water passages 118 are formed beneath the intake ports 106, respectively. Nevertheless, no cooling water passage is formed between the prechamber 109 and each of the intake ports 106; instead thin-walled solid cylinder head portions 119 exist between the upper wall portion 109a of the prechamber 109 and the intake ports 106. Consequently, since the inner walls of the intake ports 106 are strongly heated by the heat generated in the prechamber 109, fresh air flowing within the intake ports 106 is heated, and therefore, particularly when the engine is started when the temperature of the engine is low, it is possible to increase the rate of vaporization of the injected fuel.

As mentioned above, according to the present invention, since fresh air is forced into the prechamber 109 after burned gas in the prechamber 109 is sucked out, it is possible to obtain a good ignition and burning in the prechamber 109.

Figure 24:
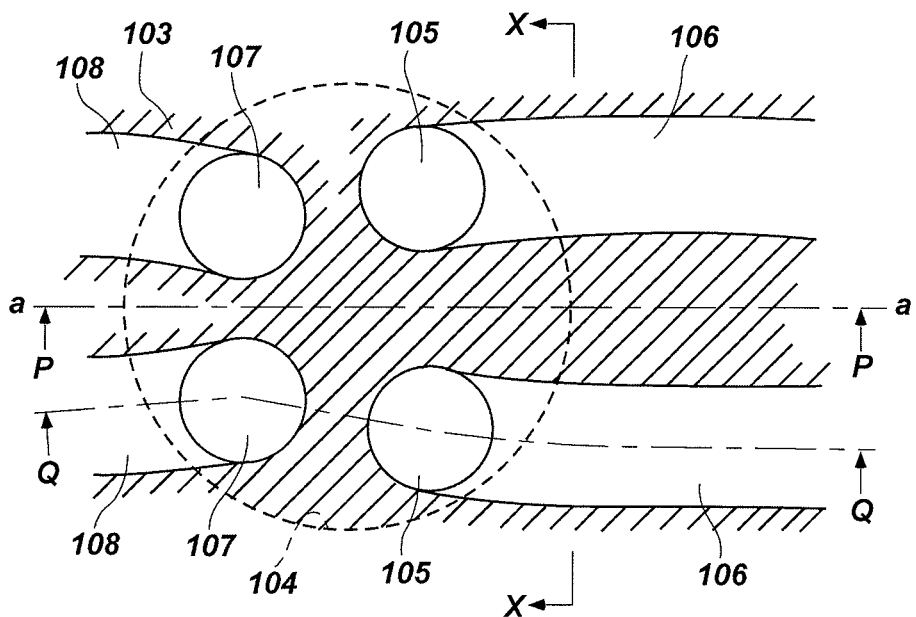
FIG. 24 is a view illustrating an inner wall of a cylinder head of the two-stroke or four-stroke Otto cycle engine of FIG. 23.
Figure 25:
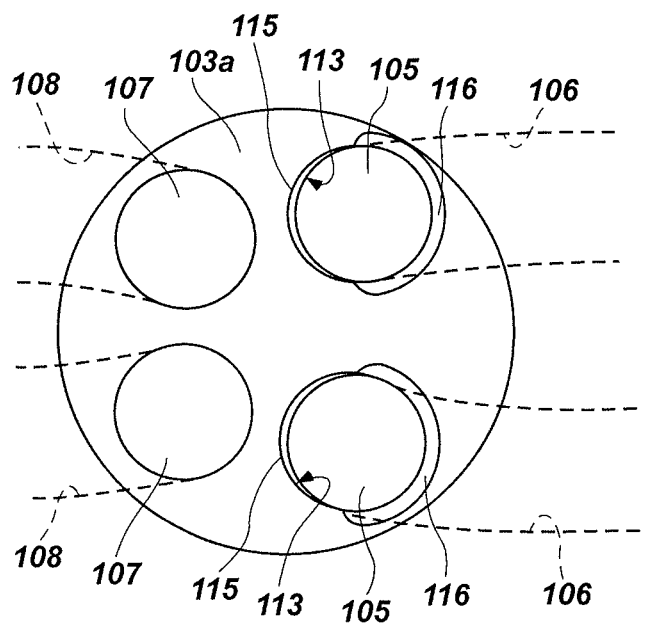
FIG. 25 is a cross-sectional side view of the two-stroke or four-stroke Otto cycle engine, taken along section line Q-Q of FIG. 24.

As illustrated in FIG. 23, FIG. 24, FIG. 25, and FIG. 26, reference numeral 100 designates a cylinder block for a spark ignition internal combustion engine which does not include a prechamber 109 therein as discussed hereinbefore, 102 is a piston reciprocally movable in the cylinder block 100, 103 is a cylinder head fixed onto the cylinder block 100, and 104 is a main combustion chamber formed between the flat inner wall 103a of the cylinder head 103 and the flat top face of the piston 102; 105 designates a pair of intake valves, 106 designates intake ports, 107 designates a pair of exhaust valves, and 108 designates exhaust ports; 111 is a fuel injector for injecting fuel into the intake port 6 (see FIG. 25), and a glow plug 112 and spark plug 112 arranged in the cylinder head 103 for igniting the fuel/air mixture therein. As illustrated in FIG. 24 and FIG. 25, a pair of the intake valves 105 are arranged on one side of the inner wall 103a of the cylinder head 103, symmetrically with respect to the symmetrical plane a-a, including the axis of the cylinder head 103; and a pair of the exhaust valves 107 are arranged on the other side of the inner wall 103a of the cylinder head 103, symmetrically with respect to the symmetrical plane a-a. Further, as can be seen from FIGS. 12 and 13, the distance between the intake valves 105 is larger than the distance between the exhaust valves 107. In the embodiment illustrated in FIGS. 23 through 26, the distance between the intake valves 105 is considerably larger than the transverse width of the distance between the exhaust valves 107.

A pair of depressions 113 is formed in the inner wall 103a of the cylinder head 103, and valve seats 114 for the intake valves 105 are arranged in the deepest parts of the interiors of the corresponding depressions 113. Accordingly, when the intake valves 105 are seated on the valve seats 114, the intake valves 105 are retracted in the depressions 113. The peripheral wall portions of the depressions 113, which are located on the exhaust valve side, are arranged as close as possible to the peripheral portions of the corresponding intake ports 106 and have a semi-cylindrical shape, and thus these semi-cylindrical peripheral wall portions of the depressions 113 form masking walls 115 which cover the valve openings of the corresponding intake valves 105, which are located on the exhaust valve side. Conversely, the peripheral wall portions 116 of the depressions 113, which are positioned opposite to the corresponding masking walls 115, have a conical shape which diverges toward the main combustion chamber 104.

In the embodiment illustrated in FIGS. 23 through 26, as illustrated in FIG. 19, the exhaust valves 107 open may open earlier than the intake valves 105, and the exhaust valves 107 may close earlier than the intake valves 105, although the individual opening and closing of the intake and exhaust valves 105, 107, respectively, may vary as desired with the engine design for the desired fuel.

When the exhaust valves 107 are open, burned gas in the main combustion chamber 104 is abruptly discharged into the exhaust ports 108. Then, when the intake valves 105 are open, fresh air flows into the main combustion chamber 104. At this time, since the valve openings of the intake valves 105, which openings are located on the exhaust valve side, are masked by the masking walls 115, the fresh air flows into the main combustion chamber 104 from the valve opening of the intake valves 105, which openings are located on the opposite side of the masking walls 115, along the semi-spherical peripheral wall portions 116. Then, as illustrated by the arrows S in FIGS. 15 and 16, the fresh air flows downward along the inner wall 103a, of the cylinder head 103, located beneath the intake valves 105 and then moves forward along the top face of the piston 102 and flows upward along the inner wall 103a of the cylinder head 103, located beneath the exhaust valves 107. Thus, the fresh air flows within the main combustion chamber 104 in the form of a loop. The burned gas in the main combustion chamber 104 is discharged via the exhaust valves 107 by the air stream S flowing in the form of a loop manner.

As can be seen from FIG. 25, the intake valves 105 are arranged on the peripheral portion of the inner wall 103a of the cylinder head 103 and therefore, if considering only the peripheral portions of the intake valves 105, which are located within the ranges of the semi-cylindrical peripheral wall portions 116, the peripheral portions of the intake valves 105 are positioned closer to the peripheral end portion of the inner wall 103a of the cylinder head 103, compared with the peripheral portions of the intake valves 105, which are near the opening 110. As a result, fresh air flows easily into the main combustion chamber 104 from the valve openings of the intake valves 105 and thus the fresh air flowing into the main combustion chamber 104 from the intake ports 106 has a velocity distribution where the velocity component of the fresh air becomes maximum and the combined air streams move downward along the inner wall 103*a* of the cylinder head 103.

Figure 26:
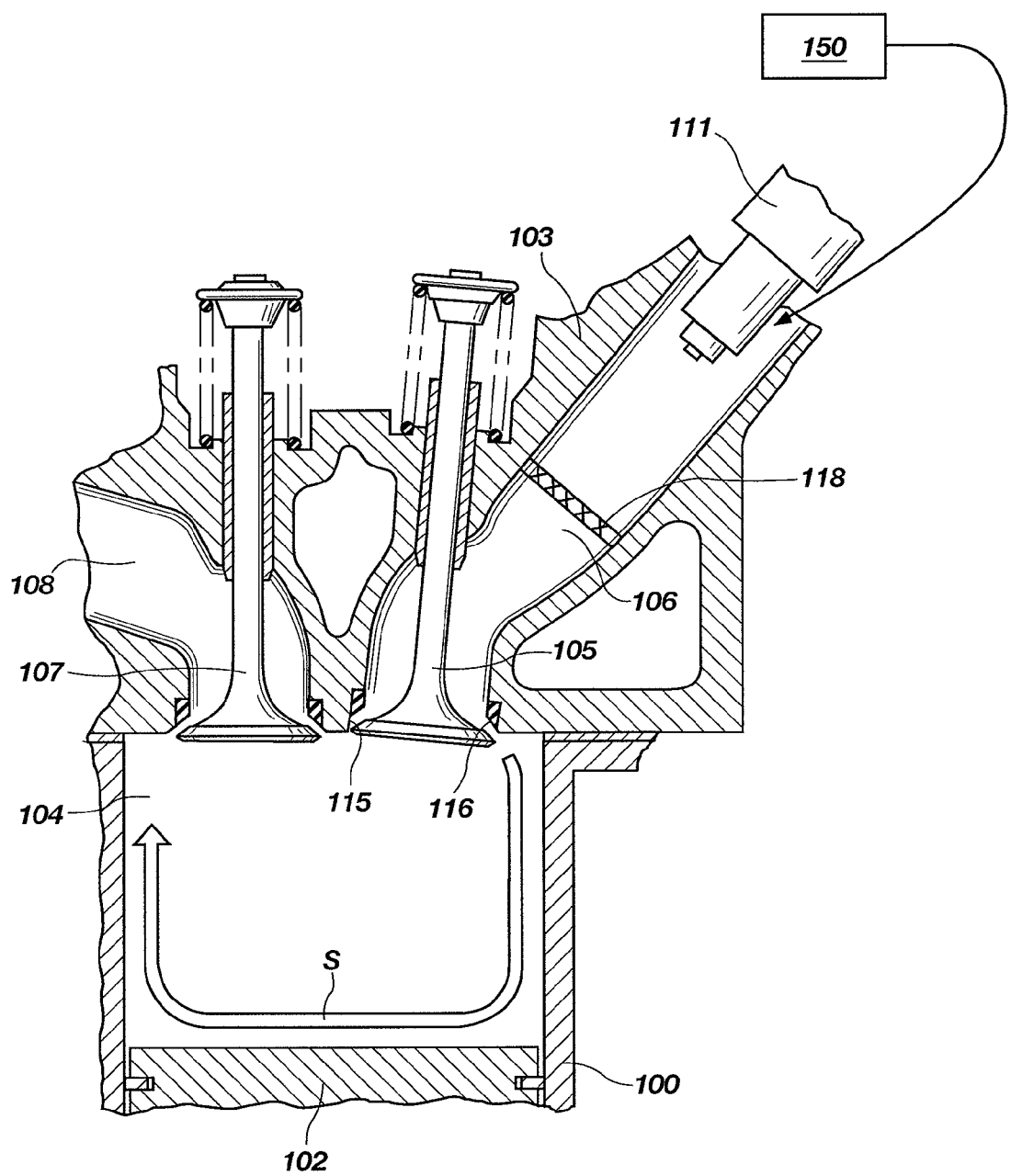
FIG. 26 is an enlarged cross-sectional side view of the two-stroke or four-stroke Otto cycle engine, taken along section line Q-Q of FIG. 24.

Since the air streams flow downward along the inner wall 103*a* of the cylinder head 103 after being merged, almost only fresh air exists in the main combustion chamber 104. For increased flexibility in operation of the engine on different types of fuels, as illustrated in FIG. 26, a fuel injector 111 injects fuel in intake ports 106 for the fuel/air mixture to flow across catalytic screen 118 in intake ports 106 for the decomposed fuel/air mixture to flow into the main combustion chamber 104 during the intake stroke. In this manner, by varying the valve time of the intake valves 105 for the main combustion chamber 104 and varying the fuel injection timing and amount of fuel injected into the intake ports 106 for the main combustion chamber 104 the fuel/air mixture in the main combustion chamber 104 may be very lean for good ignition and combustion characteristics of the fuel/air mixture therein. By using a lean fuel/air mixture in the main combustion chamber 104, the octane rating of the fuel may be increased for enhanced performance from the engine.

Additionally, as illustrated in FIG. 26, a supercharger or turbo-charger 150 may be connected to the intake ports 106 upstream of the fuel injector 111 and catalytic screen 118 to use the increased temperature of the air from the supercharger or turbo-charger 150 to increase both the vaporization of the fuel droplets from the fuel injector 111 and increase the reaction rate of the fuel/air mixture decomposition by the catalytic screen 118 for an increase in the octane rating of the fuel for enhanced performance of the engine.

While any type spark ignition system may be used, for multi-fuel applications, an inductive ignition system is preferred over a capacitive discharge type ignition system as the inductive ignition system discharges energy continuously into the fuel/air mixture as opposed to the multiple strike discharge strategy of a capacitive discharge-type ignition system.

Figure 27:
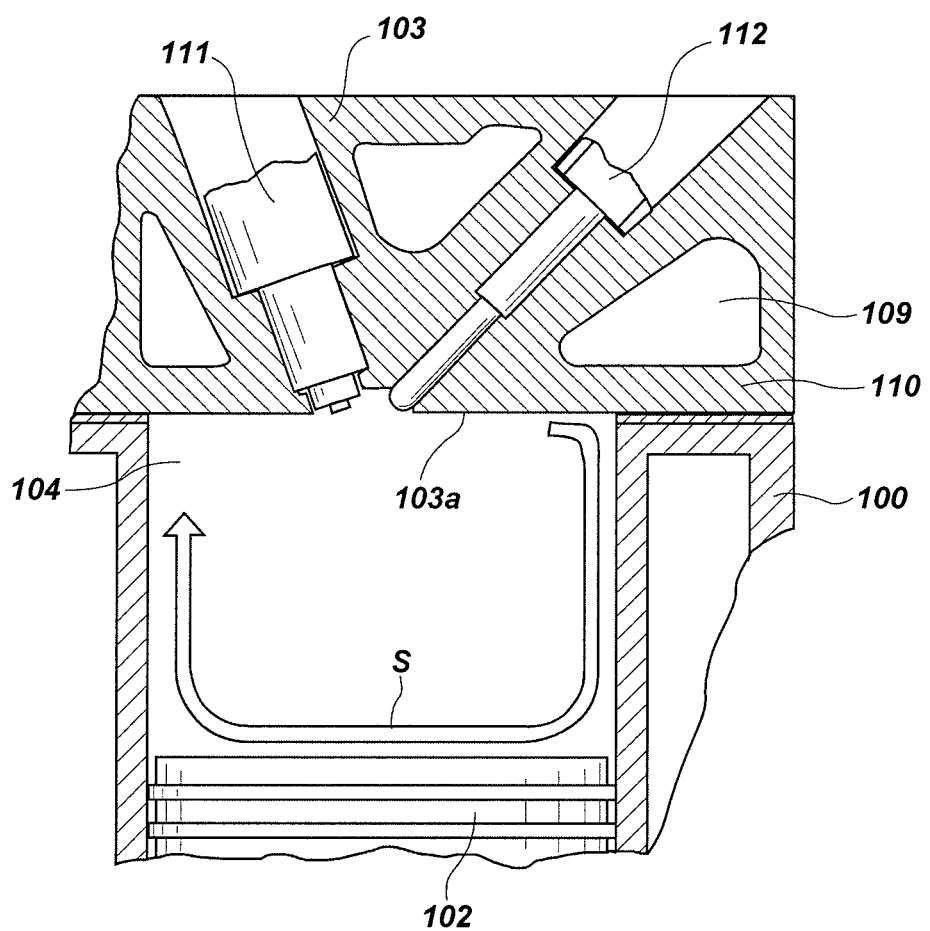
FIG. 27 is a cross-sectional plan view of a two-stroke or four-stroke Diesel cycle engine.
Figure 28:
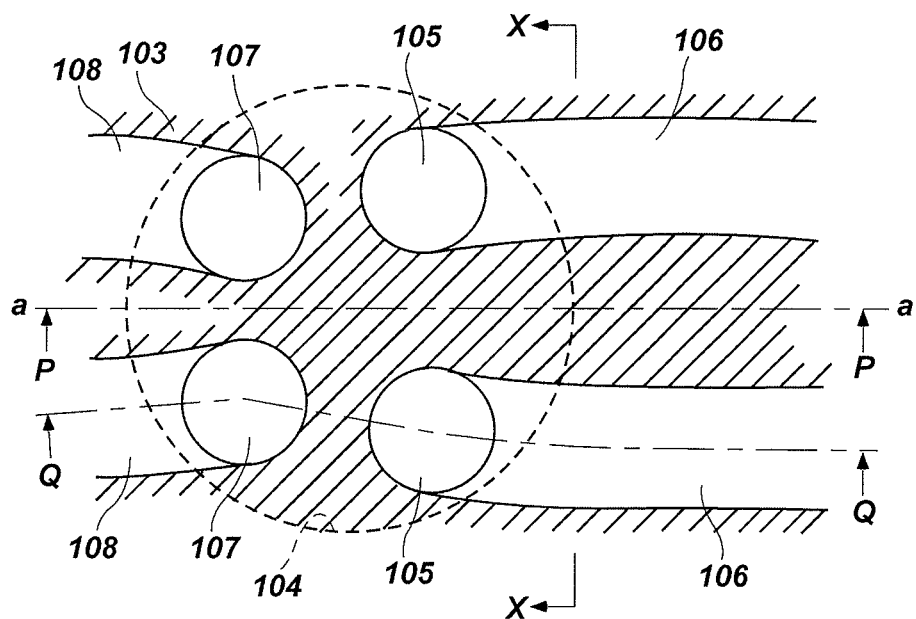
FIG. 28 is a view illustrating an inner wall of the cylinder head of the two-stroke or four-stroke Diesel cycle engine of FIG. 27.
Figure 29:
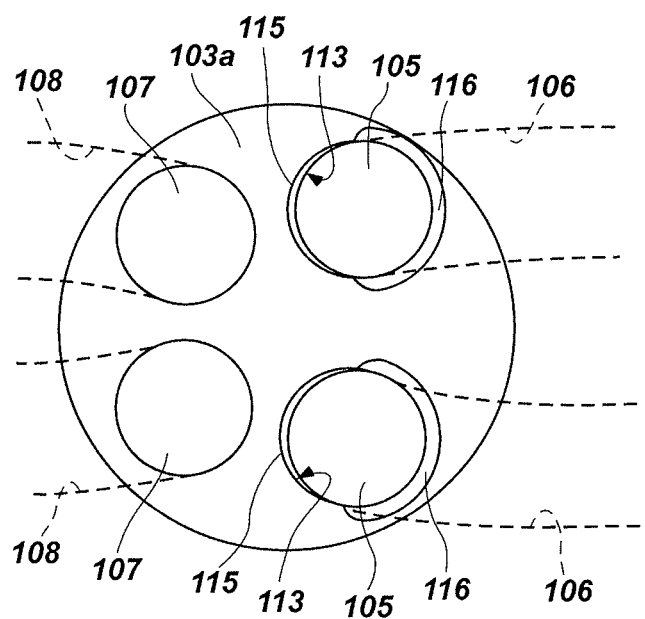
FIG. 29 is a cross-sectional side view of the two-stroke or four-stroke Diesel cycle engine, taken along section line Q-Q of FIG. 27.

As illustrated in drawing FIG. 27, FIG. 28, FIG. 29, and FIG. 30, reference numeral 100 designates a cylinder block for a compression ignition internal combustion engine which does not include a prechamber 109 therein as discussed hereinbefore, 102 is a piston reciprocally movable in the cylinder block 100, 103 is a cylinder head fixed onto the cylinder block 100, and 104 is a main combustion chamber formed between the flat inner wall 103*a* of the cylinder head 103 and the flat top face of the piston 102; 105 designates a pair of intake valves, 106 designates intake ports, 107 designates a pair of exhaust valves, and 108 designates exhaust ports; 111 is a fuel injector for injecting fuel into the intake port 106 (see FIG. 30), and 112 is a glow plug arranged in the cylinder head 103 for igniting the fuel/air mixture therein. As illustrated in FIG. 28 and FIG. 29, a pair of the intake valves 105 are arranged on one side of the inner wall 103*a* of the cylinder head 103, symmetrically with respect to the symmetrical plane a-a including the axis of the cylinder head 103; and a pair of the exhaust valves 107 are arranged on the other side of the inner wall 103*a* of the cylinder head 103, symmetrically with respect to the symmetrical plane a-a. Further, as can be seen from FIGS. 28 and 29, the distance between the intake valves 105 is larger than the distance between the exhaust valves 107. In the embodiment illustrated in FIGS. 23 through 26, the distance between the intake valves 105 is considerably larger than the transverse width of the distance between the exhaust valves 107.

A pair of depressions 113 is formed in the inner wall 103*a* of the cylinder head 103, and valve seats 114 for the intake valves 105 are arranged in the deepest parts of the interiors of the corresponding depressions 113. Accordingly, when the intake valves 105 are seated on the valve seats 114, the intake valves 105 are retracted in the depressions 113. The peripheral wall portions of the depressions 113, which are located on the exhaust valve side, are arranged as close as possible to the peripheral portions of the corresponding intake ports 106 and have a semi-cylindrical shape, and thus these semi-cylindrical peripheral wall portions of the depressions 113 form masking walls 115 which cover the valve openings of the corresponding intake valves 105, which are located on the exhaust valve side. Conversely, the peripheral wall portions 116 of the depressions 113, which are positioned opposite to the corresponding masking walls 115, have a conical shape which diverges toward the main combustion chamber 104.

In the embodiment illustrated in FIGS. 27 through 29, as illustrated in FIG. 19, the exhaust valves 107 open may open earlier than the intake valves 105, and the exhaust valves 107 may close earlier than the intake valves 105, although the individual opening and closing of the intake and exhaust valves 105, 107, respectively, may vary as desired with the engine design for the desired fuel.

When the exhaust valves 107 are open, burned gas in the main combustion chamber 104 is abruptly discharged into the exhaust ports 108. Then, when the intake valves 105 are open, fresh air flows into the main combustion chamber 104. At this time, since the valve openings of the intake valves 105, which openings are located on the exhaust valve side, are masked by the masking walls 115, the fresh air flows into the main combustion chamber 104 from the valve opening of the intake valves 105, which openings are located on the opposite side of the masking walls 115, along the semi-spherical peripheral wall portions 116. Then, as illustrated by the arrows S in FIGS. 15 and 16, the fresh air flows downward along the inner wall 103*a* of the cylinder head 103, located beneath the intake valves 105 and then moves forward along the top face of the piston 102 and flows upward along the inner wall 103*a* of the cylinder head 103, located beneath the exhaust valves 107. Thus, the fresh air flows within the main combustion chamber 104 in the form of a loop. The burned gas in the main combustion chamber 104 is discharged via the exhaust valves 107 by the air stream S flowing in the form of a loop manner.

As can be seen from FIG. 29, the intake valves 105 are arranged on the peripheral portion of the inner wall 103*a* of the cylinder head 103 and therefore, if considering only the peripheral portions of the intake valves 105, which are located within the ranges of the semi-cylindrical peripheral wall portions 116, the peripheral portions of the intake valves 105 are positioned closer to the peripheral end portion of the inner wall 103*a* of the cylinder head 103, compared with the peripheral portions of the intake valves 105, which are near the opening 110. As a result, fresh air flows easily into the main combustion chamber 104 from the valve openings of the intake valves 105 and thus the fresh air flowing into the main combustion chamber 104 from the intake ports 106 has a velocity distribution where the velocity component of the fresh air becomes maximum and the combined air streams move downward along the inner wall 103*a* of the cylinder head 103.

Figure 30:
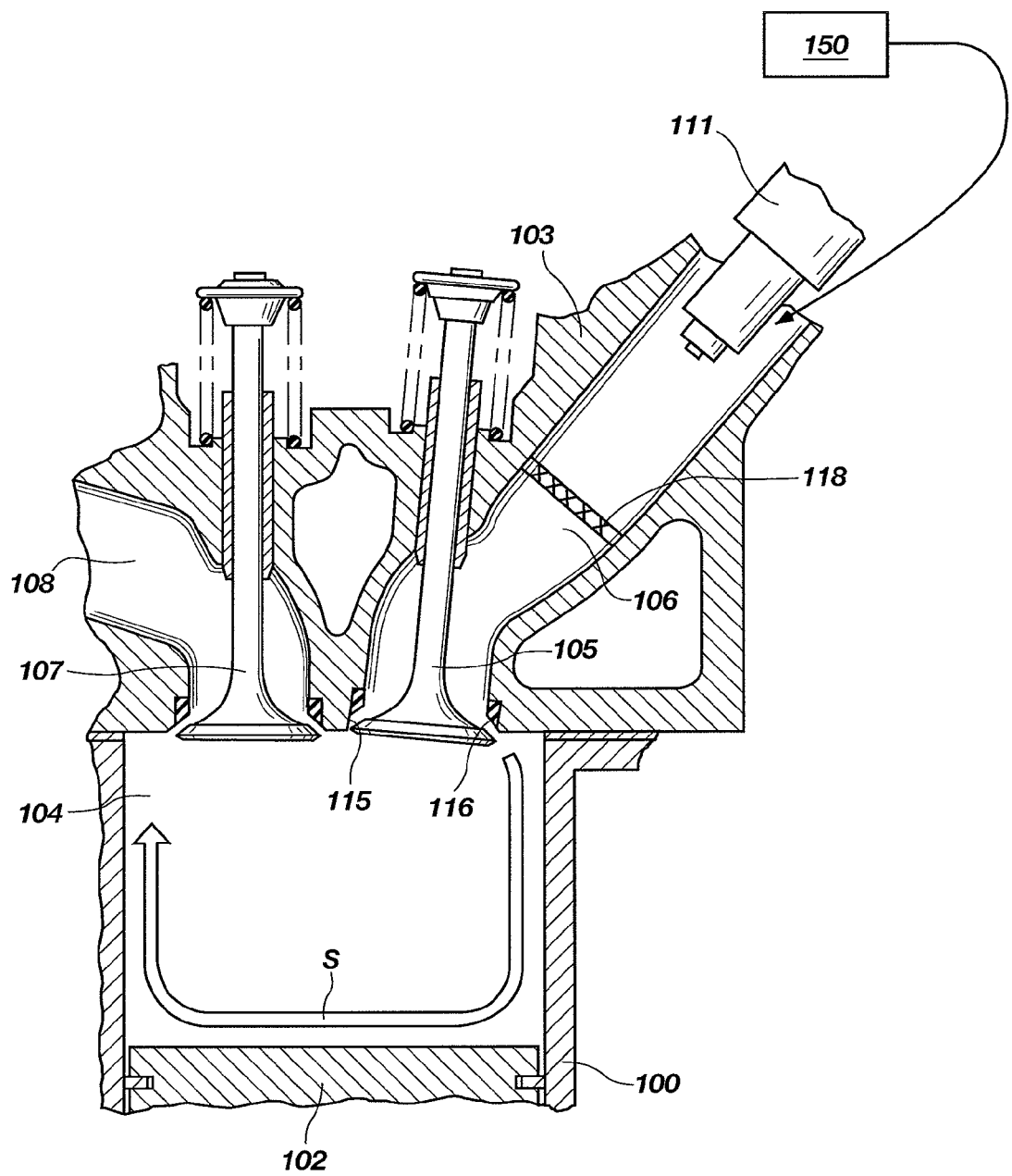
FIG. 30 is an enlarged cross-sectional side view of the two-stroke or four-stroke Otto cycle engine, taken along section line Q-Q of FIG. 24.

Since the air streams flow downward along the inner wall 103*a* of the cylinder head 103 after being merged, almost only fresh air exists in the main combustion chamber 104. For increased flexibility in operation of the engine on different types of fuels, as illustrated in FIG. 30, a fuel injector 111 injects fuel in intake ports 106 for the fuel/air mixture to flow across catalytic screen 118 in intake ports 106 for the decomposed fuel/air mixture to flow into the main combustion chamber 104 during the intake stroke. In this manner, by varying the valve time of the intake valves 105 for the main combustion chamber 104 and varying the fuel injection timing and amount of fuel injected into the intake ports 106 for the main combustion chamber 104, the fuel injected by fuel injector 111 in the cylinder head 103 into the main combustion chamber 104 by the fuel/air mixture may be initially very lean for good ignition and combustion characteristics of the fuel/air mixture in the main combustion chamber 104 after the injection of fuel therein by fuel injector 111 in the cylinder head 103. By using a lean fuel/air mixture in the main combustion chamber 104, the cetane rating of the fuel may be increased for enhanced performance from the engine.

Additionally, as illustrated in FIG. 30, a supercharger or turbo-charger 150 may be connected to the intake ports 106 upstream of the fuel injectors 111 and the catalytic screen 118 to use the increased temperature of the air from the supercharger or turbo-charger 150 to increase both the vaporization of the fuel droplets from the fuel injector 111 and increase the reaction rate of the fuel/air mixture decomposition by the catalytic screen 118 for an increase in the octane rating of the fuel for enhanced performance of the engine.

Figure 31:
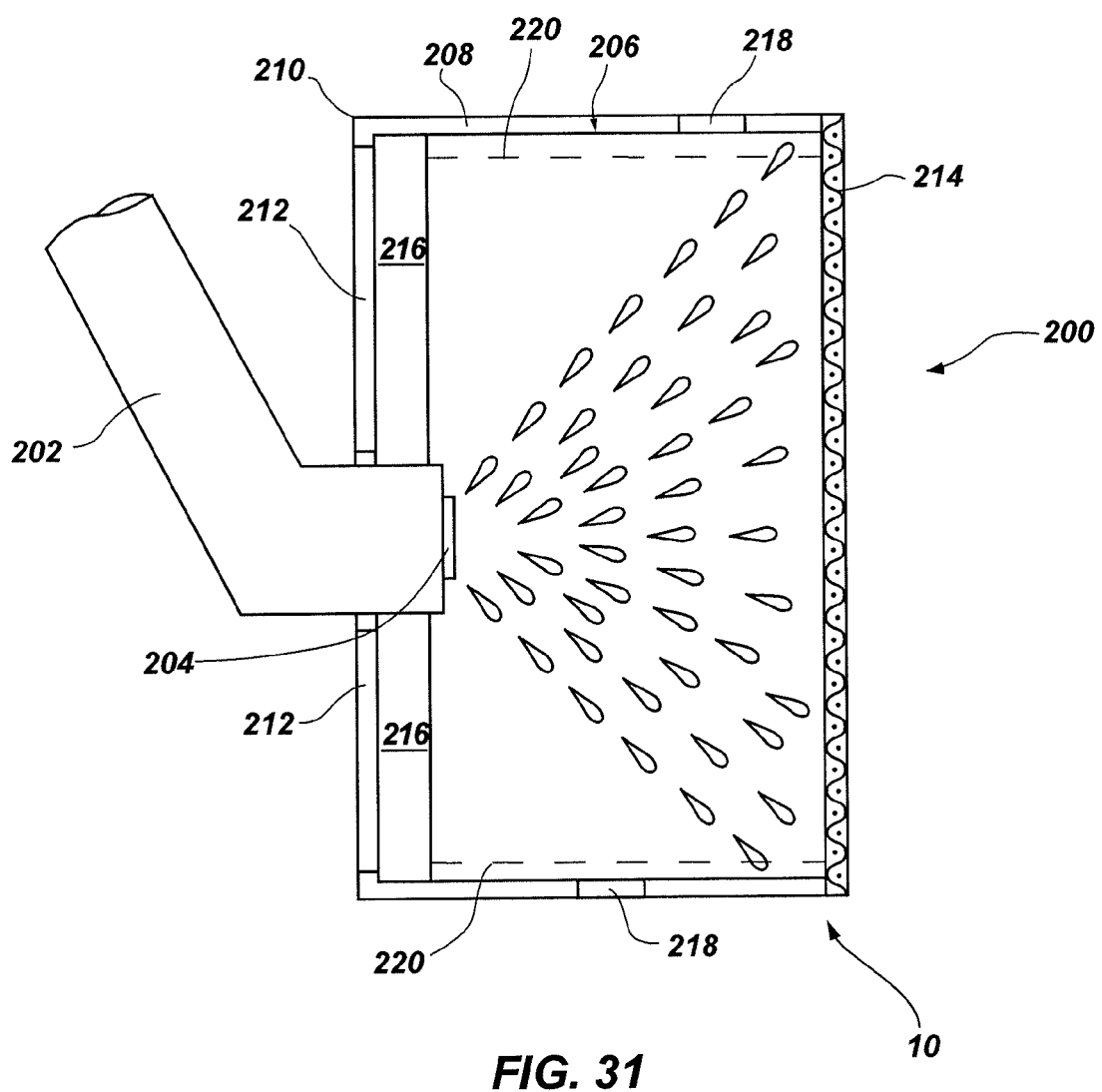
FIG. 31 is a cross-sectional view of another embodiment of the reformulation system.

Illustrated in FIG. 31, is a schematic of a fuel nozzle assembly 200 which incorporates the fuel reformulation system 10 (FIG. 1) therein for use in a gas turbine engine, a pulse jet engine, a ramjet engine, and a scram jet engine. The fuel nozzle assembly 200 includes a fuel nozzle 202 having a discharge nozzle 204 for spraying fuel therefrom, a nozzle cage 206 comprising a cage wall portion 208 having an desired geometric shape, a nozzle support end 210 attached to the fuel nozzle 202 by any suitable mounting arrangement, the nozzle support end 210 having a plurality of apertures 212 of any desired geometric shape therethrough, catalyst member 214 for decomposing the fuel contacting the catalyst member 214, the catalyst member 214 being attached to the nozzle cage wall portion 208 by any suitable arrangement, and a plurality of airfoil members 216 attached to the cage wall portion 208 by any suitable arrangement to cause the air flowing through apertures 212 to flow in a spiral, swirling manner within the cage wall portion 208 for enhanced mixing of the air flowing into the cage wall portion 208 through apertures 212 to mix with the fuel spraying from discharge nozzle 204 before contacting catalyst member 214. The airfoil member 216 may have any desired shape and flow characteristics to cause the air to flow in a desired manner therearound. If desired, the cage wall portion 208 may include one or more apertures 218 therein to aid in mixing air flowing around cage wall portion 208 with fuel from fuel discharge nozzle 204 before contacting catalyst member 214. Similarly, one or more airfoil members 216 may be attached to an inner wall of cage wall portion 208 to direct airflow through aperture(s) 218 in mixing with fuel from fuel discharge nozzle 204 before contacting catalyst member 214. Airfoils 220 (illustrated in broken lines may have any desired shape for enhanced flow of air into cage wall portion 208.

Figure 32:
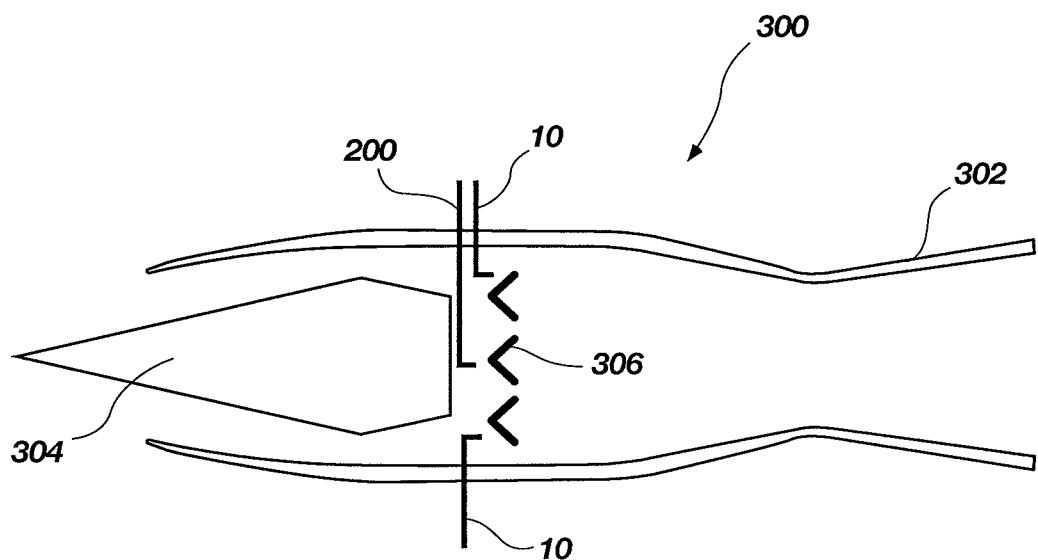
FIG. 32 is a schematic cross-sectional view of a ramjet engine having the reformulation system illustrated in FIG. 31 therein.

Illustrated in FIG. 32 is a schematic for a ramjet engine 300 in which the fuel reformulation system 10 described herein in conjunction with the fuel nozzle assembly 200 may be used. The ramjet engine 300 contains no major moving parts as the forward motion of the engine itself rams air through the engine, requiring the forward motion of the engine through the air to produce thrust. As ramjet engines require high forward speeds to operate well, the ramjet engines work most efficiently at speeds of approximately Mach 3 to at least Mach 5.

The ramjet engine 300 comprises an annular housing 302, an inlet body 304 which may translate within the annular housing 302, a plurality of fuel reformulation systems 10, and a plurality of flame holders 306 located aft of the fuel reformulation systems 10. As described previously, the fuel reformulation systems 10 spray fuel into the annular housing 302, which is ignited aft of flame holders 306 for burning in the engine 300 and accelerating out the engine 300 providing thrust. Any desired number of fuel reformulation systems 10 may be used in the engine 300 depending upon the size of the engine. The fuel reformulation systems 10 help to reformulate the fuel, typically, JP-5, JP-8, or JP-10, in the engine 300 for the more efficient combustion of the fuel.

Figure 33:
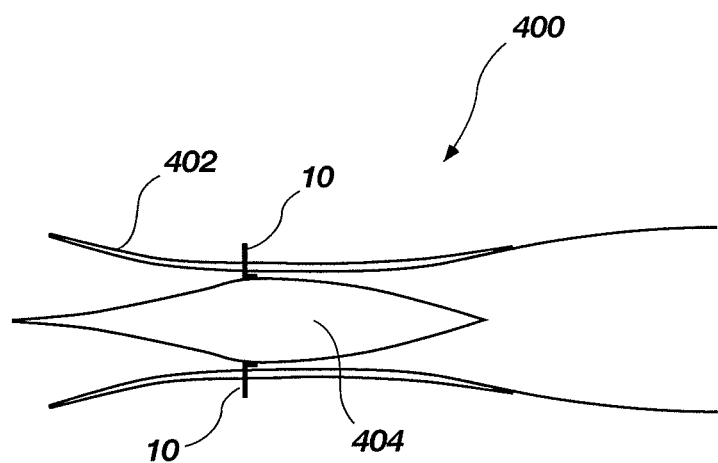
FIG. 33 is a schematic cross-sectional view of a scram jet engine having the reformulation system illustrated in FIG. 31 therein.

Illustrated in FIG. 33, is a schematic for a scram jet (supersonic combustion ramjet) engine 400 in which the fuel reformulation systems 10 described herein in conjunction with the fuel nozzle assembly 200 may be used. The scram jet engine 400 contains no major moving parts as the forward motion of the engine itself rams air through the engine requiring the forward motion of the engine through the air to produce thrust. As scramjet engines require high forward speeds to operate well, the ramjet engines work most efficiently at speeds of higher than those of a ramjet engine.

The scram jet engine 400 comprises an annular housing 402, an inlet body 404, which may translate within the housing 402, a plurality of fuel reformulation systems 10, and may include a plurality of flame holders (not shown) located aft of the fuel reformulation systems 10. As described previously, the fuel reformulation systems 10 spray fuel into the housing 402 which is ignited (aft of flame holders 406 if present) for burning in the engine 400 and accelerating out the engine 400 providing thrust. Any desired number of fuel reformulation systems 10 may be used in the engine 400 depending upon the size of the engine. The fuel reformulation systems 10 help to reformulate the fuel, typically, JP-5, JP-8, or JP-10, in the engine 400 for the more efficient combustion of the fuel.

Figure 34:
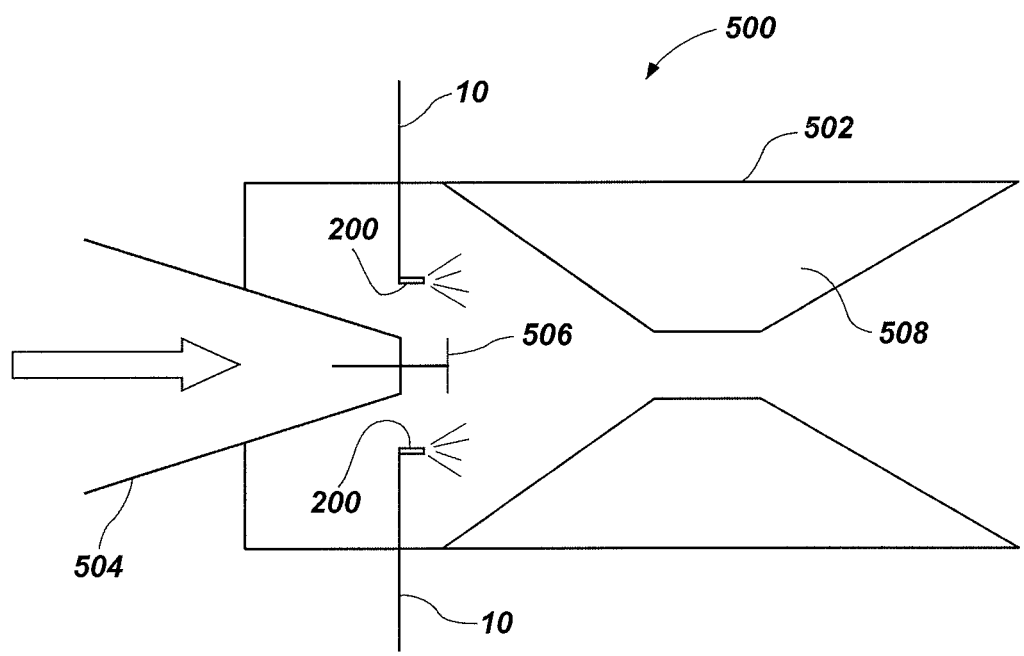
FIG. 34 is a schematic cross-sectional view of a pulse jet engine having the reformulation system illustrated in FIG. 31 therein.

Illustrated in FIG. 34 is a schematic for a pulsed jet engine 500 in which the fuel reformulation system 10 described herein in conjunction with the fuel nozzle assembly 200 may be used. The pulsed jet engine 500 contains no major moving parts, but typically contains a one-way valve, although the engine may contain an aerodynamic valve, as the forward motion of the engine itself rams air through the engine requiring the forward motion of the engine through the air to produce thrust. Pulsed jet engines require high subsonic forward speeds to operate well.

The pulsed jet engine 500 comprises an annular housing 502 having an inlet 504 thereto, the inlet having a translating valve 506 at an outlet thereof for intermittently closing the outlet of the inlet 504, and a convergent/divergent nozzle 508 located aft of the inlet 504 and a plurality of fuel reformulation systems 10. As described previously, the fuel reformulation systems 10 spray fuel into the annular housing 502 which is ignited aft of the outlet of the inlet 504 causing the valve 506 to close stopping the flow of air from the outlet of the inlet 504 until the combustion products flow out the convergent/divergent nozzle 508 from the engine 500 providing thrust. Any desired number of fuel reformulation systems 10 may be used in the engine 500 depending upon the size of the engine. The fuel reformulation systems 10 help to reformulate the fuel, typically, JP-5, JP-8, or JP-10, in the engine 500 for the more efficient combustion of the fuel.

Figure 35:
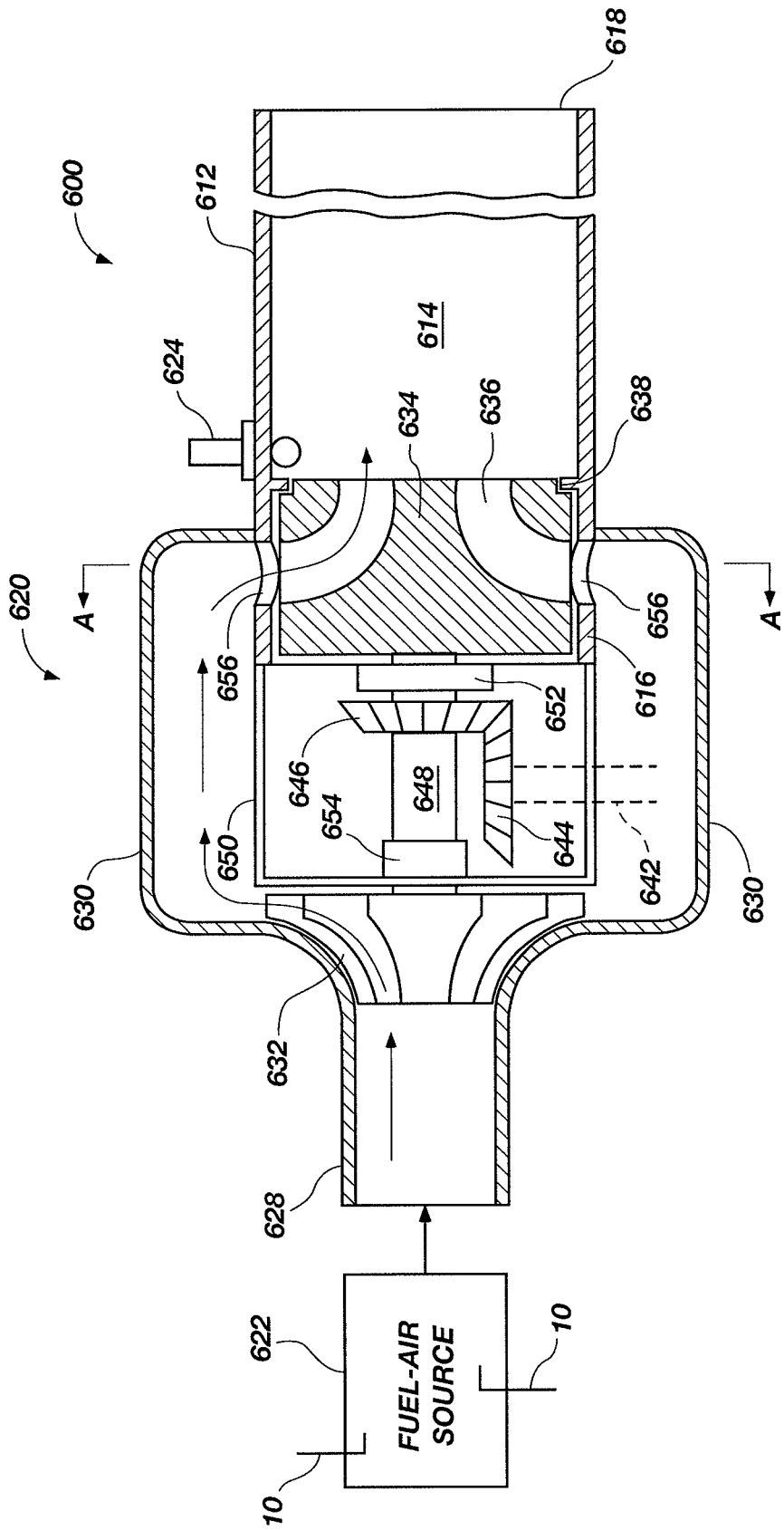
FIG. 35 is a schematic cross-sectional view of a pulsed detonation jet engine having the reformulation system illustrated in FIG. 31 therein.

Illustrated in FIG. 35 is a pulsed detonation jet engine 600, such as described in U.S. Pat. No. 6,505,462 B2, which is incorporated herein in its entirety by reference. The pulsed detonation jet engine 600 comprises a tube 612 having an internal combustion chamber 614 for the detonation of a fuel/air mixture therein. The tube 612 has a forward end 616 and an open aft end 618. A rotary valve 620 is mounted to the forward end 616 and operates to intermittently introduce fuel/air mixture into the internal combustion chamber 614. The valve 620 is connected to a fuel/air source 622 having one or more fuel reformulation systems 10 associated therewith. The open aft end 618 of the tube 612 provides an exhaust to the ambient atmosphere of the engine 600. An igniter 624 is provided in the tube 612 adjacent to the valve 620. The igniter 624 provides sufficient energy to detonate the fuel/air mixture in the internal combustion chamber 614. The region of the internal combustion chamber 614 near the igniter 624 is the detonation zone of the engine 600. The detonation combustion depends on the pressure, temperature and equivalence ratio of the fuel/air mixture, as well as the ignition energy to start ignition of the fuel/air mixture.

A centrifugal compressor 632 is used to compress the fuel/air mixture which is connected to rotary valve 634 with the pair being driven by an external power source (not shown) connected to shaft 642, as shown in broken lines.

Any desired number of fuel reformulation systems 10 may be used in the pulsed detonation jet engine 600 depending upon the size of the engine. The fuel reformulation systems 10 help to reformulate the fuel, typically, JP-5, JP-8, or JP-10, in the engine 600 for the more efficient combustion of the fuel.

Figure 36:
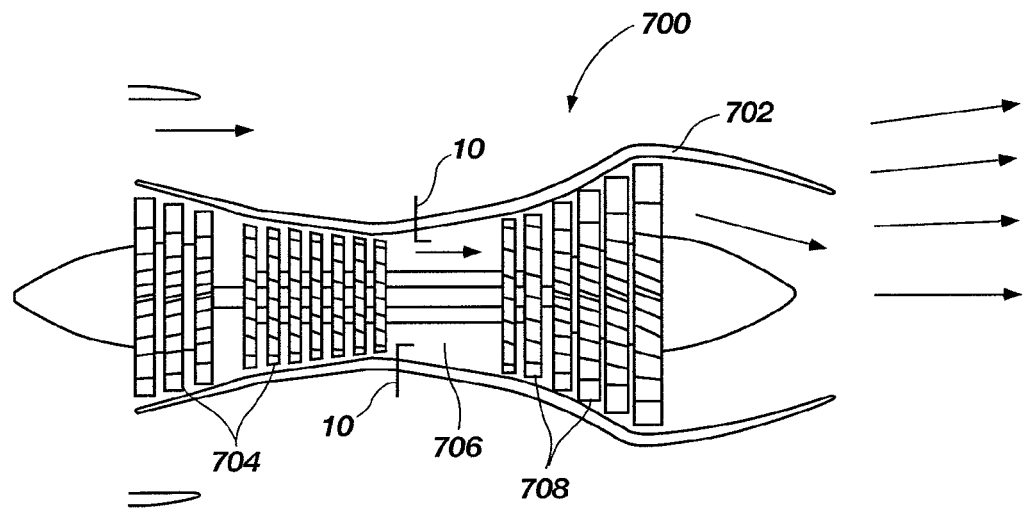
FIG. 36 is a schematic cross-sectional view of a turbojet engine having the reformulation system illustrated in FIG. 31 therein.

Illustrated in FIG. 36, is a turbojet engine 700 comprising annular housing 702, compressors 704 located therein, combustion chamber 706, either annular or a plurality of can-type combustors, having any desired number of fuel reformulation systems 10 associated therewith, and turbines 708 through which combustion products from the combustion chamber 706 flow therethrough. The turbines 708 are connected to the compressors 704 to drive the compressors 704 to cause airflow through the engine 700.

Any desired number of fuel reformulation systems 10 may be used in the turbojet engine 700 depending upon the size of the engine. The fuel reformulation systems 10 help to reformulate the fuel, typically, JP-5, JP-8, or JP-10, in the engine 700 for the more efficient combustion of the fuel.

Figure 37:
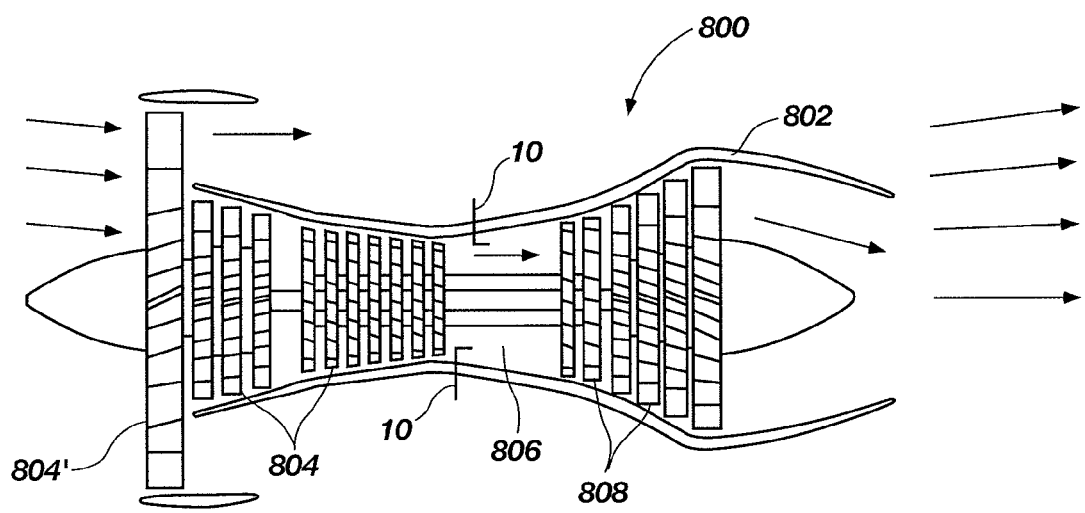
FIG. 37 is a schematic cross-sectional view of a turbofan jet engine having the reformulation system illustrated in FIG. 31 therein.

Illustrated in FIG. 37, is a turbofan jet engine 800 comprising annular housing 802, compressors 804 located therein and fan 804' located in front thereof, combustion chamber 806, either annular or a plurality of can-type combustors, having any desired number of fuel reformulation systems 10 associated therewith, and turbines 808 through which combustion products from the combustion chamber 806 flow therethrough. The turbines 808 are connected to the compressors 804 and fan 804' to drive the compressors 804 and fan 804' to cause airflow through the engine 800.

Any desired number of fuel reformulation systems 10 may be used in the turbofan engine 800 depending upon the size of the engine. The fuel reformulation systems 10 help to reformulate the fuel, typically, JP-5, JP-8, or JP-10, in the engine 800 for the more efficient combustion of the fuel.

Figure 38:
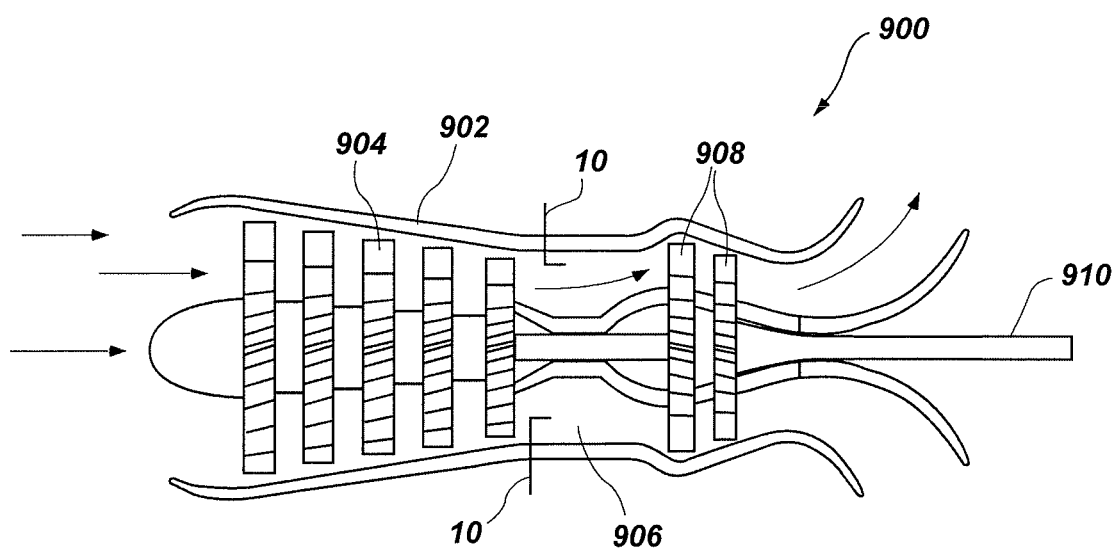
FIG. 38 is a schematic cross-sectional view of a turboshaft jet engine having the reformulation system illustrated in FIG. 31 therein.

Illustrated in FIG. 38, is a turboshaft jet engine 900 comprising annular housing 902, compressor 904 located therein, combustion chamber 906, either annular or a plurality of can-type combustors, having any desired number of fuel reformulation systems 10 associated therewith, and turbines 908 through which combustion products from the combustion chamber 906 flow therethrough. The turbines 908 are connected to the compressor 904 and shaft 910 to drive the compressor 904 to cause airflow through the engine 900 while the shaft 910 may be used to power other apparatus.

Any desired number of fuel reformulation systems 10 may be used in the turboshaft jet engine 900 depending upon the size of the engine. The fuel reformulation systems 10 help to reformulate the fuel, typically, JP-5, JP-8, or JP-10, in the engine 900 for the more efficient combustion of the fuel.

Figure 39:
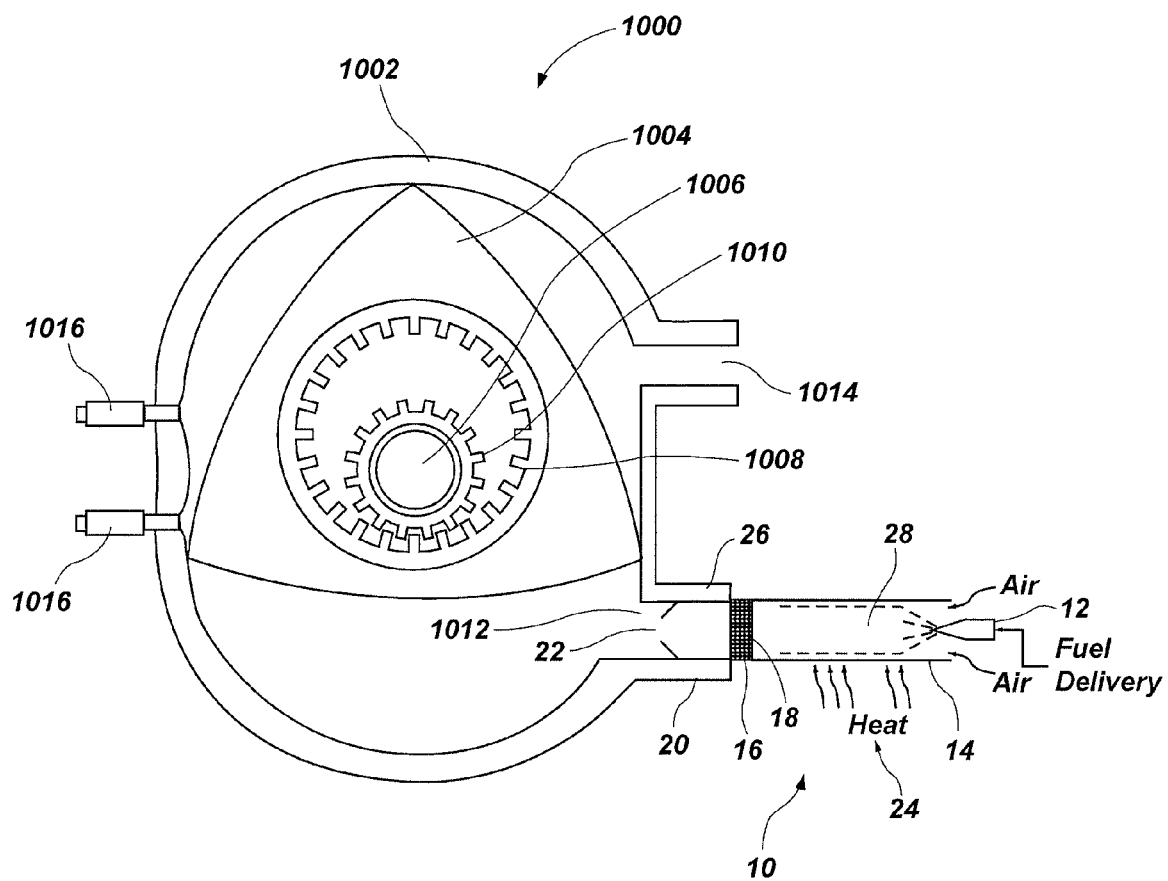
FIG. 39 is a schematic of a Wankel engine.

Illustrated in FIG. 39 is a schematic of a Wankel engine 1000 an annular housing 1002 having an intake port 1012, an exhaust port 1014, and one or more spark plugs 1016 or glow plugs therein, a rotor 1004 having a similar shape to a Reuleaux triangle, and a crankshaft 1006 connected to the rotor 1004 through gear 1008 connected to the rotor 1004 and gear 1010 connected to the crankshaft 1006. Connected to intake port 1012 is fuel reformulation system 10, as described hereinbefore, supplying a suitable fuel/air mixture to the engine 1000. A Wankel engine uses a four-stroke engine cycle, such as an Otto cycle or a Diesel cycle, but may use a wide suitable, generally hydrocarbon, variety of fuels therein.

While the invention has been described by reference to specific embodiments chosen for purposes of illustration, it should be apparent that numerous modifications could be made thereto by those skilled in the art without departing from the basic concept and scope of the invention.

What is claimed is:

1. A fuel reformulation system, comprising:
   a fuel source;
   an annular body operatively connected to an engine and comprising:
   an air inlet upstream of an outlet of the fuel source and configured to receive air separate from fuel from the fuel source;
   a mixing section downstream of the air inlet and the outlet of the fuel source, the mixing section positioned and configured to produce a fuel and air mixture from the air and the fuel; and
   at least one screen member downstream of the mixing section and comprising a catalytic material positioned and formulated to convert a portion of the fuel and air mixture into hydrogen gas; and
   A heating apparatus limited to an exterior portion of the mixing section of the annular body upstream of the at least one screen member.

2. The fuel reformulation system of claim 1, wherein the annular body is operatively connected to an air inlet of the engine.

3. The fuel reformulation system of claim 1, wherein the annular body is operatively connected to a fuel system of the engine.

4. The fuel reformulation system of claim 1, wherein the fuel source comprises a pressure injector.

5. The fuel reformulation system of claim 1, wherein the fuel source comprises a tube.

6. The fuel reformulation system of claim 1, wherein the annular body further comprises a member configured to direct a flow of the fuel and air mixture within the annular body.

7. The fuel reformulation system of claim 1, wherein the catalytic material comprises a precious metal.

8. The fuel reformulation system of claim 1, further comprising an annular chamber downstream of the at least one screen member.

9. The fuel reformulation system of claim 8, further comprising insulation on at least a portion of the annular chamber.

10. The fuel reformulation system of claim 8, further comprising an orifice downstream of the annular chamber.

11. The fuel reformulation system of claim 1, wherein the engine comprises one of an Otto cycle engine, an Otto cycle Wankel engine, a Diesel cycle engine, a Diesel cycle Wankel engine, a ramjet engine, a scram jet engine, a pulsed jet engine, a pulsed detonation jet engine, a turbojet engine, a turbofan jet engine, and a turboshaft engine.

12. The fuel reformulation system of claim 1, further comprising a prechamber connected to the engine.

13. The fuel reformulation system of claim 1, wherein the catalytic material is formulated to crack hydrocarbons.

14. The fuel reformulation system of claim 1, wherein the annular body further comprises a restricted outlet downstream of the at least one screen member.

15. The fuel reformulation system of claim 1, wherein the at least one screen member comprises a stack of screen members.

16. The fuel reformulation system of claim 1, wherein the at least one screen member comprises a mesh of short contact time elements.

17. The fuel reformulation system of claim 1, wherein the at least one screen member comprises a wire mesh comprising the catalytic material.

18. The fuel reformulation system of claim 1, wherein the at least one screen member comprises a wire mesh coated with the catalytic material.

19. A fuel reformulation system, comprising:
a fuel source;
an annular body located within an engine and comprising:
an air inlet upstream of an outlet of the fuel source and configured to receive air separate from fuel from the fuel source;
a mixing section downstream of the air inlet and the outlet of the fuel source, the mixing section positioned and configured and positioned to produce a fuel and air mixture from the air and the fuel; and
at least one screen member downstream of the mixing section and comprising a catalytic material positioned and formulated to convert a portion of the fuel and air mixture into hydrogen gas; and
A heating apparatus limited to an exterior portion of the mixing section of the annular body upstream of the at least one screen member.

20. The fuel reformulation system of claim 19, wherein the annular body is connected to a fuel system of the engine.

21. The fuel reformulation system of claim 19, wherein the fuel source comprises a pressure injector.

22. The fuel reformulation system of claim 19, wherein the annular body further comprises a member configured to direct a flow of the fuel and air mixture within the annular body.

23. The fuel reformulation system of claim 22, further comprising another member located on an interior wall of the annular body and configured to direct a flow of the fuel and air mixture within the annular body.

24. The fuel reformulation system of claim 23, wherein the annular body has a plurality of openings therein.

25. The fuel reformulation system of claim 19, wherein the catalytic material comprises a precious metal.

26. The fuel reformulation system of claim 19, further comprising an annular chamber downstream of the at least one screen member.

27. The fuel reformulation system of claim 19, further comprising an orifice downstream of the annular chamber.

* * * * *

UNITED STATES PATENT AND TRADEMARK OFFICE
CERTIFICATE OF CORRECTION

PATENT NO. : 8,882,863 B2  
APPLICATION NO. : 12/465407  
DATED : November 11, 2014  
INVENTOR(S) : Dean Modroukas et al.

Page 1 of 1

It is certified that error appears in the above-identified patent and that said Letters Patent is hereby corrected as shown below:

In the specification:

| | | |
|---|---|---|
| COLUMN 7, | LINE 6, | change "pressure drop," to --pressure drops,-- |
| COLUMN 16, | LINE 8, | change "by the arrow" to --by an arrow-- |
| COLUMN 18, | LINE 1, | change "spark plug 112" to --spark plug 112′-- |
| COLUMN 21, | LINE 59, | change "lines may" to --lines) may-- |

In the claims:

| | | | |
|---|---|---|---|
| CLAIM 1, | COLUMN 24, | LINE 39, | change "A heating" to --a heating-- |
| CLAIM 19, | COLUMN 26, | LINE 7, | change "A heating" to --a heating-- |

Signed and Sealed this  
Fourth Day of August, 2015

Michelle K. Lee  
*Director of the United States Patent and Trademark Office*